(12) United States Patent
Shimamura et al.

(10) Patent No.: US 8,851,995 B2
(45) Date of Patent: Oct. 7, 2014

(54) GAME APPARATUS FOR PERFORMING GAME PROCESSING ACCORDING TO AN ATTITUDE OF AN INPUT DEVICE AND GAME PROGRAM

(71) Applicant: Nintendo Co., Ltd., Kyoto (JP)

(72) Inventors: Takayuki Shimamura, Kyoto (JP); Shinya Hiratake, Kyoto (JP); Toyoki Kataoka, Kyoto (JP); Yoshikazu Yamashita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 13/947,152

(22) Filed: Jul. 22, 2013

(65) Prior Publication Data

US 2013/0310180 A1    Nov. 21, 2013

Related U.S. Application Data

(63) Continuation of application No. 12/366,160, filed on Feb. 5, 2009, now Pat. No. 8,535,132.

(30) Foreign Application Priority Data

Jul. 11, 2008   (JP) .................................. 2008-181422

(51) Int. Cl.
| | | |
|---|---|---|
| *A63F 9/00* | (2006.01) | |
| *A63F 13/00* | (2014.01) | |
| *G06F 17/00* | (2006.01) | |
| *G06F 19/00* | (2011.01) | |
| *A63F 13/20* | (2014.01) | |
| *A63F 13/40* | (2014.01) | |

(52) U.S. Cl.
CPC ......... *A63F 13/06* (2013.01); *A63F 2300/6045* (2013.01); *A63F 13/10* (2013.01); *A63F 2300/105* (2013.01); *A63F 2300/8076* (2013.01)
USPC .......................................................... 463/37

(58) Field of Classification Search
USPC ........................................................... 463/37
See application file for complete search history.

(56) References Cited

U.S. PATENT DOCUMENTS

| 6,545,661 B1 | 4/2003 | Goschy et al. |
| 6,966,775 B1 | 11/2005 | Kendir et al. |

(Continued)

FOREIGN PATENT DOCUMENTS

| JP | 2007-300962 A | 11/2007 |
| JP | 2008-67853 A | 3/2008 |

(Continued)

OTHER PUBLICATIONS

Mario and Sonic at the Olympic Games Archery, http://www.youtube.com/watch?v=vAxcjKgGp0M. Uploaded Jul. 18, 2009.*

(Continued)

*Primary Examiner* — David L Lewis
*Assistant Examiner* — Reginald Renwick
(74) *Attorney, Agent, or Firm* — Nixon & Vanderhye, P.C.

(57) ABSTRACT

A game apparatus includes a CPU, and the CPU sets a moving direction, that is, a position and an orientation of a moving object within a game space on the basis of angular velocity data transmitted from a first controller, that is, an attitude of a gyro sensor unit (gyro sensor). Then, when a second controller is drawn toward a near side in a state that a C button and a Z button thereof are simultaneously pressed, and the C button and the Z button are simultaneously released in that state, the moving object is shot.

10 Claims, 24 Drawing Sheets

(56) References Cited

U.S. PATENT DOCUMENTS

| | | |
|---|---|---|
| 7,817,134 B2 | 10/2010 | Huang et al. |
| 8,308,564 B2 | 11/2012 | Yoshida et al. |
| 2003/0195046 A1 | 10/2003 | Bartsch |
| 2005/0130739 A1 | 6/2005 | Argentar |
| 2005/0227775 A1 | 10/2005 | Cassady et al. |
| 2006/0258454 A1 | 11/2006 | Brick |
| 2007/0129152 A1 | 6/2007 | Tsai et al. |
| 2007/0270215 A1 | 11/2007 | Miyamoto et al. |
| 2008/0132334 A1* | 6/2008 | Nonaka et al. .......... 463/37 |
| 2008/0194337 A1 | 8/2008 | Hensel |
| 2009/0005140 A1 | 1/2009 | Rose et al. |
| 2009/0017909 A1 | 1/2009 | Yamada |
| 2010/0105479 A1 | 4/2010 | Wilson et al. |
| 2010/0113153 A1 | 5/2010 | Yen et al. |
| 2010/0173686 A1 | 7/2010 | Grant et al. |

FOREIGN PATENT DOCUMENTS

| | | |
|---|---|---|
| JP | 2008-142509 A | 6/2008 |
| SG | 153767 | 7/2009 |

OTHER PUBLICATIONS

Mario and Sonic at the Olympic Games, http://www.ign.com/games/mario-sonic-at-the-olympic-games/wii-896694, Nov. 6, 2007.*

"Monster Hunter 2" released on Feb. 16, 2006 on p. 49.

* cited by examiner

FIG. 3
(A)
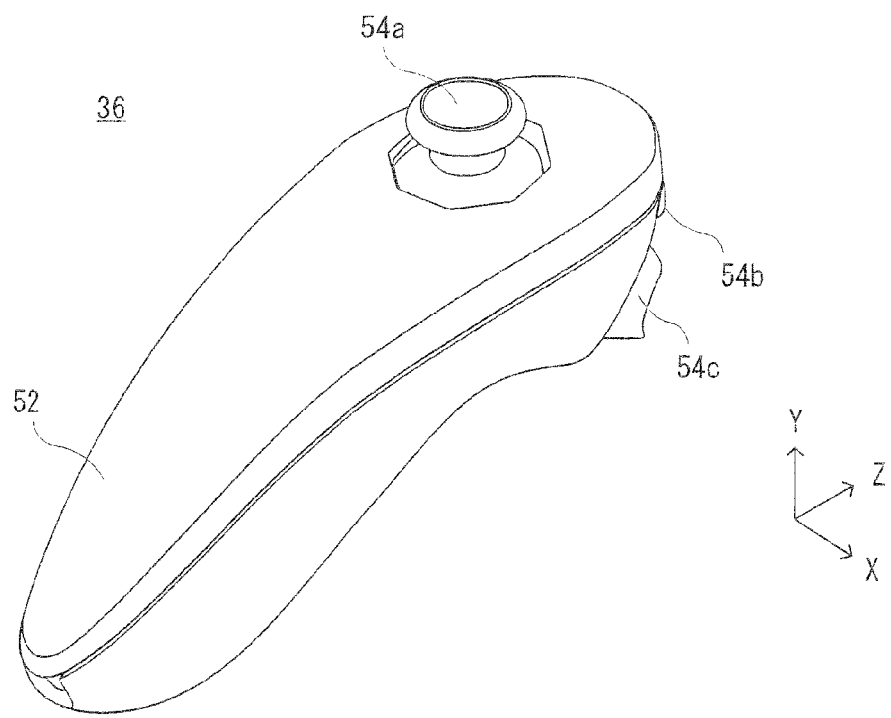
(B)
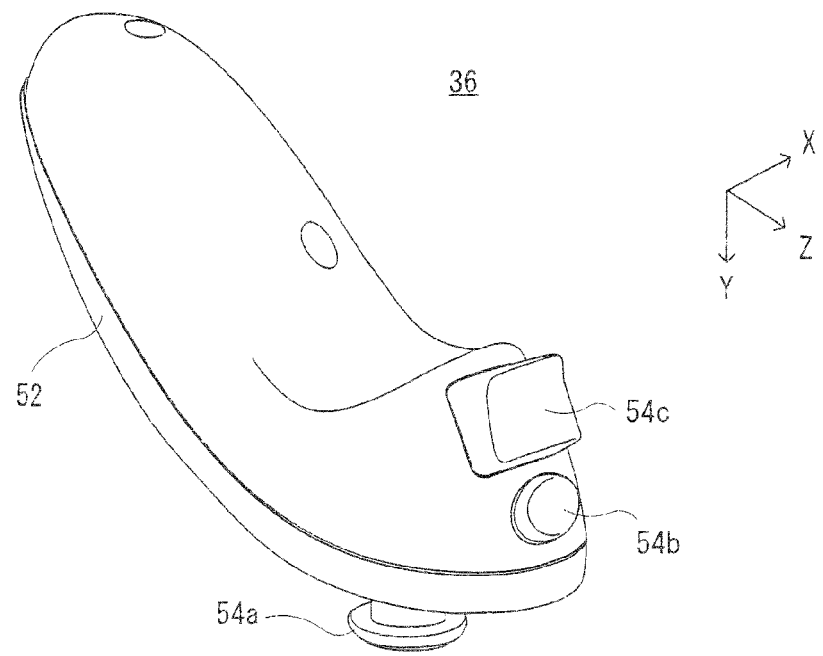

FIG. 6
(A)
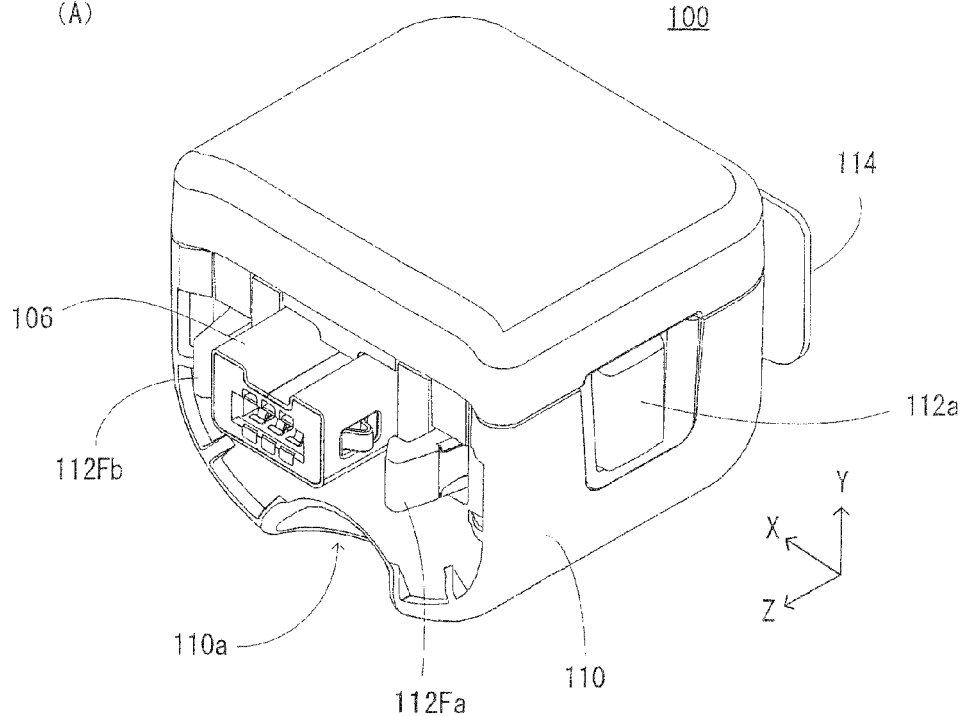
(B)
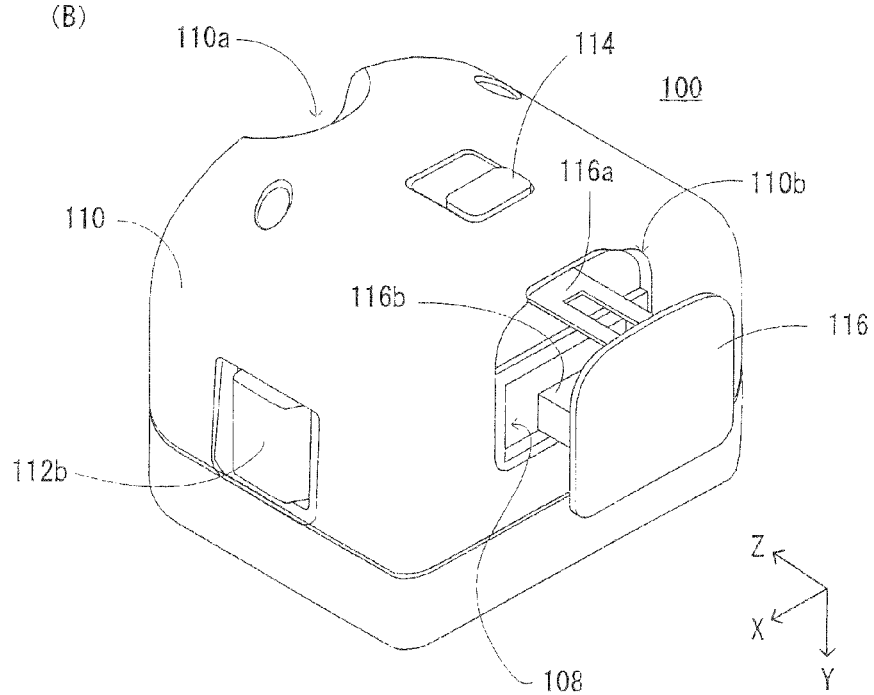

FIG. 16

(A) (DATA FORMAT FOR GYRO)

| YAW ANGULAR VELOCITY DATA |
| --- |
| ROLL ANGULAR VELOCITY DATA |
| PITCH ANGULAR VELOCITY DATA |
| YAW ANGULAR VELOCITY MODE INFORMATION |
| ROLL ANGULAR VELOCITY MODE INFORMATION |
| PITCH ANGULAR VELOCITY MODE INFORMATION |
| SECOND CONNECTOR CONNECTION INFORMATION |
| GYRO/SECOND CONTROLLER IDENTIFYING INFORMATION |

(B) (DATA FORMAT FOR SECOND CONTROLLER)

| X STICK OPERATION DATA |
| --- |
| Z STICK OPERATION DATA |
| X ACCELERATION DATA |
| Y ACCELERATION DATA |
| Z ACCELERATION DATA |
| BUTTON OPERATION DATA |
| SECOND CONTROLLER CONNECTION INFORMATION |
| GYRO/SECOND CONTROLLER IDENTIFYING INFORMATION |

FIG. 19

| CONTROL TARGET \ MODE | STANDBY | BYPASS | GYRO | GYRO AND SECOND CONTROLLER |
|---|---|---|---|---|
| GYRO FUNCTION | NO ACTIVE | NO ACTIVE | ACTIVE | ACTIVE |
| GYRO POWER SOURCE | OFF | OFF | ON | ON |
| BUS SWITCH | CONNECT | CONNECT | DISCONNECT | DISCONNECT |
| EXPANDING CONNECTOR | NO ACTIVE | ACTIVE | NO ACTIVE | ACTIVE |
| Attach 1 | LOW | HIGH | HIGH | HIGH |
| I2C ADDRESS | SPECIAL | SPECIAL | – | – |

FIG. 20
(A) GYRO-COMPATIBLE APPOICATION
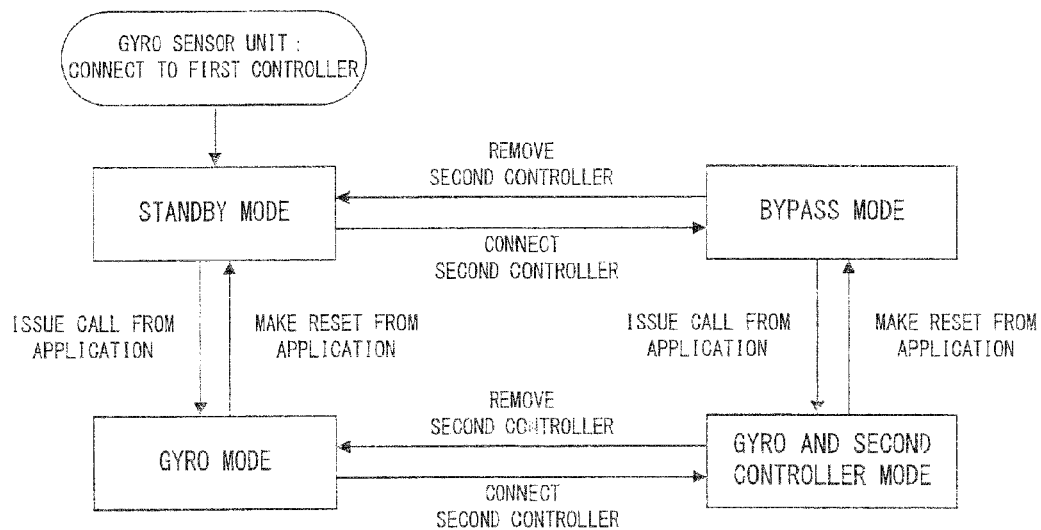
(B) GYRO-INCOMPATIBLE
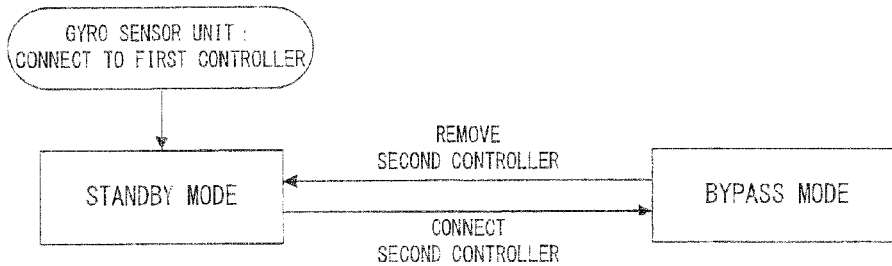

GAME APPARATUS FOR PERFORMING GAME PROCESSING ACCORDING TO AN ATTITUDE OF AN INPUT DEVICE AND GAME PROGRAM

CROSS REFERENCE TO RELATED APPLICATIONS

This application is a continuation of U.S. Ser. No. 12/366,160, filed Feb. 5, 2009, which claims priority to Japanese Patent Application No. 2008-181422, filed Jul. 11, 2008, the entire contents of each of which are hereby incorporated by reference.

BACKGROUND

1. Technical Field

The technology presented herein relates to a game apparatus and a game program. More specifically, the present technology relates to a game apparatus and a game program capable of executing game processing, such as shooting or firing an object by fixing a direction, like a bow and arrow, a bow gun, etc.

2. Description of the Related Art

One example of a game apparatus of such a kind is disclosed in "Monster Hunter 2" released on Feb. 16, 2006 on page 49. In the game apparatus of the related art, by deciding a shooting direction of an arrow with a cross key, and by inclining a joystick backward, a bowstring of a bow fit with the arrow is drawn, and by inclining the joystick forward, the arrow is shot.

In the related art, a moving direction of the arrow is adjusted with the cross key, and therefore, there is a problem of taking a lot of time until the moving direction is fixed, that is, a target is tightly aimed. Furthermore, there is another problem that an action of taking aim with the bow in response to an operation with the cross key is not intuitive.

SUMMARY

Therefore, it is a primary feature of the example embodiments presented herein to provide a novel game apparatus and a game program.

Another feature of the embodiments is to provide a game apparatus and a game program capable of performing an intuitive operation.

A still another feature of the embodiments is to provide a game apparatus and a game program capable of rapidly setting and firing a moving direction of an object.

The present embodiments employ the following features in order to solve the above-described problems. It should be noted that reference numerals and the supplements inside the parentheses show one example of a corresponding relationship with the embodiments described later for easy understanding of the present embodiments, and do not limit the present embodiments.

A first embodiment is a game apparatus which performs game processing according to an attitude of an input device, and comprises an operation data obtaining means for obtaining operation data from the input device which outputs attitude correlation data on the basis of an attitude, a planned moving direction setting means for changing a planned moving direction of a first object within a game space in accordance with the attitude correlation data, a movement instruction inputting means for instructing the first object to move on the basis of the operation data, and a movement starting means for deciding a moving direction of the first object to be the planned moving direction set at a timing based on the movement instructing input, and starting to move the first object in that direction.

In the first embodiment, a game apparatus (12: reference numeral indicating a corresponding part in this embodiment, and this can be applied to the following) of this embodiment uses a first controller (remote controller) (34), that is, a gyro sensor unit (100) and a second controller (36) as an input device (14). The input device outputs attitude correlation data (yaw angle, pitch angle, roll angle) on the basis of an attitude thereof, and outputs operation data in response to an operation of an input means or an operating portion (46). The attitude correlation data and the operation data are input to an operation data obtaining means (62) in a wireless manner, for example. A planned moving direction setting means (60, S15, FIG. 28) sets a planned moving direction of a first object, an arrow object (144), for example, within a game space in accordance with an attitude of the input device, that is, attitude correlation data. For example, a movement instruction is input on the basis of operation data of the input device, such as a second controller (36). In this embodiment, a movement instruction inputting means (60, S11, S17) instructs the first object to move when the second controller (36) is drawn toward a near side in a predetermined state, and canceled from the predetermined. Then, a movement starting means (60, S21, S23) decides a moving direction of the first object to be the planned moving direction set at a timing based on the movement instructing input, and starts to move the first object in the direction.

The movement instruction inputting means may input a movement instruction in response to an operation of a joystick (54a) of the second controller (36), for example, other than the above. Alternatively, a movement instruction may be input in response to an operation of a specific button (A button 46d, for example) of the first controller (34).

In the first embodiment, by changing an attitude of the input device, it is possible to set or decide a moving direction or a planned moving direction of the first object. Accordingly, it is possible to quickly perform the setting of the moving direction.

A second embodiment further comprises an orientation setting means for deciding an orientation of a second object in accordance with the attitude of the input device, wherein the planned moving direction setting means changes the moving direction of the first object in accordance with the orientation of the second object.

In the second embodiment, an orientation setting means (60, S7, S13) sets an orientation of a second object, that is, a bow object (142) when the first object is an arrow object (144) in this embodiment. Accordingly, the moving direction of the first object is changed depending on the orientation of the second object. According to the second embodiment, it is possible to set the planned moving direction of the first object (moving object) by adjusting the orientation of the second object.

In a third embodiment the input device includes a gyro sensor, and outputs angular velocity data on the basis of an output from at least the gyro sensor as the operation data, and the planned moving direction setting means changes the planned moving direction of the first object on the basis of the angular velocity data.

In the third embodiment, the input device (14) includes a gyro sensor (104), and from the input device, angular velocity data detected by the gyro sensor is output as the attitude correlation data. Accordingly, the planned moving direction setting means (60, S15, FIG. 28) sets the planned moving direction of the first object according to the angular velocity data. According to the third embodiment, it is possible to set a planned moving direction by the gyro sensor.

In a fourth embodiment the input device further includes a first acceleration sensor capable of being moved with the gyro sensor, and further outputs acceleration data on the basis of an output from at least the first acceleration sensor as the operation data, and the planned moving direction setting means changes the planned moving direction of the first object on the basis of the angular velocity data and the acceleration data.

In the fourth embodiment, the input device (14) further includes a first acceleration sensor (84). The planned moving direction setting means changes the planned moving direction of the first object on the basis of the angular velocity data and the acceleration data. According to the fourth embodiment, it is possible to adjust the planned moving direction on the basis of angular velocities and accelerations.

In a fifth embodiment the planned moving direction setting means calculates an attitude on the basis of the angular velocity data, and calculates the planned moving direction of the first object by bringing the attitude into correspondence with an attitude calculated by performing a correction on the basis of the acceleration data.

In the fifth embodiment, for example, by bringing the attitude calculated for each frame close to the attitude decided by the acceleration data, accumulated errors of the angular velocity data from the gyro sensor are corrected. In this embodiment, a rotation (M) is calculated such that a gravitational direction (v) assumed from the attitude of the first controller (34) is close to the direction of an acceleration vector (a) detected by the first acceleration sensor (84). The rotation amount of the rotation (M) is set such that as the size of the acceleration vector (a) is close to the size of the gravitational acceleration, the gravitational direction (v) is close to the acceleration vector (a). According to the fifth embodiment, it is possible to effectively remove the accumulated errors necessarily caused in the processing on the basis of the angular velocity form the gyro sensor.

In a sixth embodiment the planned moving direction setting means calculates an attitude in a yaw direction on the basis of the angular velocity data, and calculates an attitude in a pitch direction on the basis of the acceleration data.

As in the sixth embodiment, on the basis of the angular velocity data from the gyro sensor (104), an attitude in a yaw direction of the moving object is calculated, and on the basis of the acceleration data from the acceleration sensor (84), an attitude in a pitch direction is calculated.

In a seventh embodiment the input device further includes a first key, and further outputs key data on the basis of an operation performed on the first key as the operation data, and the movement instruction inputting means instructs the first object to move at a timing when the key data satisfies a predetermined condition.

In the seventh embodiment, the input device is provided with a first key, that is, a C button (54b) and/or a Z button (54c) of the Nunchaku (36) in this embodiment. In the key data from the input device, when the key data of the first key satisfies a predetermined condition (simultaneous releasing the C button (54b) and the Z button (54c), for example), the movement instruction inputting means inputs the movement instruction. According to the seventh invention, it is possible to also input a movement instruction by the key data.

In an eighth embodiment the input device further includes a second acceleration sensor capable of being independently moved with the gyro sensor and further outputs acceleration data on the basis of the output from the second acceleration sensor as the operation data, and the movement instruction inputting means determines a state that the input device moves to a predetermined direction with the first key operated on the basis of the key data and the acceleration data, and instructs the first object to move at a timing when the operation by the first key is released.

In the eighth embodiment, if another acceleration sensor (86) is provided to the second controller (36), and the aforementioned first key is provided to the controller (36), and detects whether or not there is a premise operation for a movement instruction on the basis of the acceleration data from the second acceleration sensor (86) with the first key, that is, the C button (54b) and the Z button (54c) are simultaneously pushed, for example. In this embodiment, the attitude of the second controller (36) with reference to the Y axis is evaluated from the acceleration data obtained by multiplying the acceleration detected by the acceleration sensor (86) of the second controller (36) by a predetermined damper coefficient. Whether or not the inner product between "the unit vector in a −Z direction" in that attitude and "the difference between the acceleration at the current step (timing) of the second controller (36) and the acceleration at the previous step" exceeds a constant value is determined. If the inner product exceeds the constant value, it is determined that there is a movement instructing input. According to the eighth embodiment, when the second controller (36) is drawn to the near side at speeds higher than a constant speed, it is determined that the premise for the movement instruction is established, and therefore, in a case of a shooting game utilizing a bow and arrow, for example, by drawing the second controller, an operation of drawing a bow can be performed, capable of shooting an arrow by performing an intuitive operation on the bow.

In a ninth embodiment the input device further includes a stick capable of performing a direction input, and further outputs stick input data as the operation data, and the movement instruction inputting means instructs the first object to move at a timing when the stick input data satisfies a predetermined condition.

In the ninth embodiment, the input device (14) includes a joystick (54a) provided to the second controller (36), for example, and the movement instruction inputting means inputs a movement instruction in response to an operation by the joystick (54a), that is, a shift operation from a backward tilt to a forward tilt. According to the ninth invention, similar to conventional analogous game apparatuses, it is possible to input a movement instruction by the joystick.

In a tenth embodiment the input device further includes a second key, and further outputs key data on the basis of an operation performed on the second key as the operation data, and the planned moving direction setting means calculates a change of the attitude from a reference on the basis of a change from the operation at the timing when the key is operated during the operation of the key.

In the tenth embodiment, the input device (14) includes an A button (46d) or a B button (46h) as a second key which are provided to the first controller (34). When the A button (46d) or the B button (46h) is operated, the basic attitude of the input device (14) is decided as a reference, and the planned moving direction setting means (60, S15, FIG. 28) sets the planned moving direction in accordance with the change from the basic attitude of the input device (14). According to the tenth embodiment, according to an operation of the second key, that is, the A button (46d) or the B button (46h), for example, a reference or a basic attitude is decided, and the planned moving direction is set in accordance with the change therefrom, and therefore, it is possible to expect an effect of causing the player to precisely face the monitor (26), for example.

An eleventh embodiment is a storage medium capable of being read by a processor of a game apparatus which performs game processing in accordance with an attitude of an input device, the storage medium storing a program, the program causes the processor to function as an operation data obtaining means for obtaining operation data from the input device which outputs attitude correlation data on the basis of an attitude, a planned moving direction setting means for changing a planned moving direction of a first object within a game space in accordance with the attitude correlation data, a movement instruction inputting means for instructing the first object to move on the basis of the operation data, and a movement starting means for deciding a moving direction of the first object to be the planned moving direction set at a timing on the basis of the movement instructing input, and starting to move the first object in the direction.

In also the eleventh embodiment, it is possible to expect advantages the same as those in the first embodiment.

In a twelfth embodiment the program causes the processor to further function as an orientation setting means for deciding an orientation of a second object in accordance with the attitude of the input device, wherein the planned moving direction setting means changes the moving direction of the first object in accordance with the orientation of the second object.

In also the twelfth embodiment, it is possible to expect advantage the same as those in the second invention.

In a thirteenth embodiment the input device includes a gyro sensor, and outputs angular velocity data on the basis of an output from at least the gyro sensor as the operation data, and the planned moving direction setting means changes the planned moving direction of the first object on the basis of the angular velocity data.

In also the thirteenth embodiment, it is possible to expect advantages the same as those in the third embodiment.

In a fourteenth embodiment the input device further includes a first acceleration sensor capable of being moved with the gyro sensor, and further outputs acceleration data on the basis of an output from at least the first acceleration sensor as the operation data, and the planned moving direction setting means changes the planned moving direction of the first object on the basis of the angular velocity data and the acceleration data.

In also the fourteenth embodiment, it is possible to expect advantages the same as those in the fourth embodiment.

In a fifteenth embodiment the planned moving direction setting means calculates an attitude on the basis of the angular velocity data, and calculates the planned moving direction of the first object by bringing the attitude into correspondence with an attitude calculated by performing a correction on the basis of said acceleration data.

In also the fifteenth embodiment, it is possible to expect advantages the same as those in the fifth embodiment.

In a sixteenth embodiment the planned moving direction setting means calculates an attitude in a yaw direction on the basis of the angular velocity data, and calculates an attitude in a pitch direction on the basis of the acceleration data.

In also the sixteenth embodiment, it is possible to expect advantages the same as those in the sixth embodiment.

In a seventeenth embodiment the input device further includes a first key, and further outputs key data on the basis of an operation performed on the first key as the operation data, and the movement instruction inputting means instructs the first object to move at a timing when the key data satisfies a predetermined condition.

In also the seventeenth embodiment, it is possible to expect advantages the same as those in the seventh embodiment.

In an eighteenth embodiment the input device further includes a second acceleration sensor capable of being independently moved with the gyro sensor and further outputs acceleration data on the basis of the output from the second acceleration sensor as the operation data, and the movement instruction inputting means determines a state that the input device moves to a predetermined direction with the first key operated on the basis of the key data and the acceleration data, and instructs the first object to move at a timing when the operation by the first key is released.

In also the eighteenth embodiment, it is possible to expect advantages the same as those in the eighth embodiment.

In a nineteenth embodiment the input device further includes a stick capable of performing a direction input, and further outputs stick input data as the operation data, and the movement instruction inputting means instructs the first object to move at a timing when the stick input data satisfies a predetermined condition.

In also the nineteenth embodiment, it is possible to expect advantages the same as those in the ninth embodiment.

In a twentieth embodiment the input device further includes a second key, and further outputs key data on the basis of an operation performed on the second key as the operation data, and the planned moving direction setting means calculates a change of the attitude from a reference on the basis of a change from the operation at the timing when the key is operated during the operation of the key.

In also the twentieth embodiment, it is possible to expect advantages the same as those in the tenth embodiment.

A twenty-first embodiment is a control method of a game apparatus which performs game processing in accordance with an attitude of an input device, and includes following steps of: (a) an operation data obtaining step for obtaining operation data from the input device which outputs attitude correlation data on the basis of an attitude, (b) a moving direction setting step for changing a planned moving direction of a first object within a game space in accordance with the attitude correlation data, (c) a movement instruction inputting step for instructing the first object to move on the basis of the operation data, and (d) a movement starting step for deciding a moving direction of the first object to be the planned moving direction set at a timing on the basis of the movement instructing input, and starting to move the first object in the direction.

In also the twenty-first embodiment, it is possible to expect advantages the same as those in the first embodiment and the eleventh embodiment.

According to the present embodiments, by changing the attitude of the input device, a moving direction of the object can be adjusted, and therefore, it is possible to set or decide the moving direction of the object easily and quickly.

The above described features, aspects and advantages of the present embodiment will become more apparent from the following detailed description of the present embodiment when taken in conjunction with the accompanying drawings.

BRIEF DESCRIPTION OF THE DRAWINGS

FIG. 2(A) is a perspective view of the first controller as viewed from above rear, and FIG. 2(B) is a perspective view of the first controller as viewed from below front.

FIGS. 3(A) and 3(B) are an illustrative view showing an appearance of a second controller (Nunchaku) applied to FIG. 1 embodiment. FIG. 3(A) is a perspective view of the second controller as viewed from above rear, and FIG. 3(B) is a perspective view of the second controller as viewed from below front.

FIGS. 6(A) and 6(B) are an illustrative view showing an appearance of a gyro sensor unit applied to FIG. 1 embodiment. FIG. 6(A) is a perspective view of the gyro sensor unit as viewed from above front, and FIG. 6(B) is a perspective view of the gyro sensor unit as viewed from rear back.

FIGS. 16(A) and 16(B) are an illustrative view showing a data format dealt by the gyro sensor unit. FIG. 16(A) is an illustrative view showing a format of gyro data and FIG. 16(B) is an illustrative view showing a format of second controller data.

FIG. 19 is an illustrative view showing a table in which a control by a microcomputer of the gyro sensor unit is described for each mode.

FIGS. 20(A) and 20(B) are an illustrative view showing a mode switching applied to the gyro sensor unit. FIG. 20(A) is an illustrative view showing a mode switching when the application is a gyro-compatible type, and FIG. 20(B) is an illustrative view showing a mode switching when the application is a gyro-incompatible type.

DETAILED DESCRIPTION OF THE PREFERRED EMBODIMENTS

Figure 1:
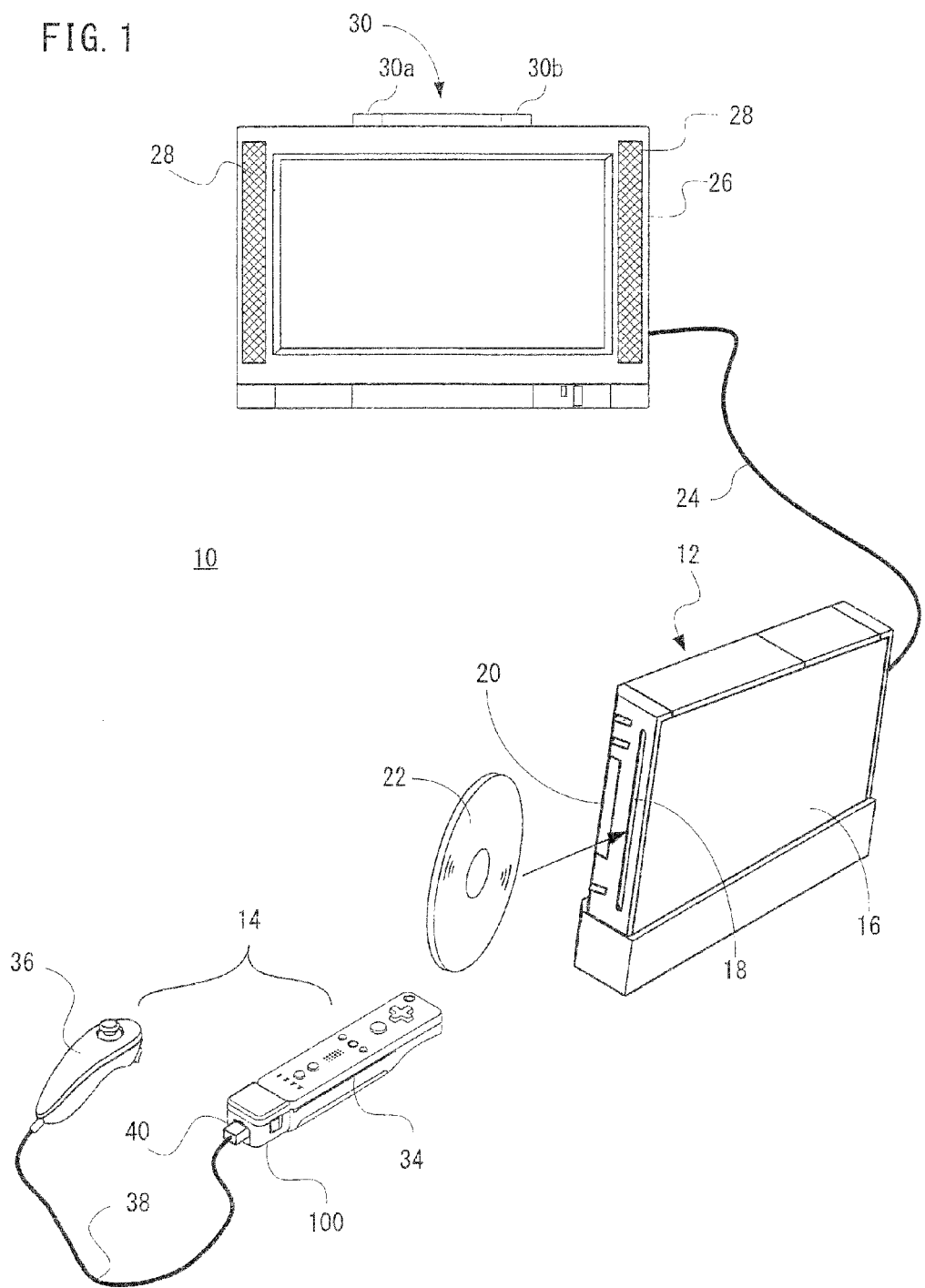
FIG. 1 is a block diagram showing a configuration of one embodiment.

Referring to FIG. 1, a game system 10 of one embodiment includes a video game apparatus (hereinafter, referred to as "game apparatus") 12 and a controller 14. The controller 14 functions as an input device or an operating device by a user or a player. The game apparatus 12 and the controller 14 are connected by radio. For example, the wireless communication is executed according to a Bluetooth (registered trademark) standard, but may be executed according to other standards, such as an infrared ray communication, a wireless LAN, etc.

The game apparatus 12 includes a roughly rectangular parallelepiped housing 16, and the housing 16 is furnished with a disk slot 18 and an external memory card slot cover 20 on a front surface. An optical disk 22 as one example of an information storage medium storing game program and data, etc. is inserted from the disk slot 18 to be loaded into a disk drive 74 (see FIG. 10) within the housing 16. Inside the external memory card slot cover 20 is provided a connector for external memory card 48 (FIG. 10) through which a memory card (not shown) is inserted. The memory card is employed for loading the game program, etc. read from the optical disk 22 to temporarily store it, storing (saving) game data (result data or proceeding data of the game) of the game played by means of the game system 10, and so forth. It should be noted that storing the game data described above may be performed on an internal memory such as a flash memory 64 (FIG. 10) in place of the external memory card.

The game apparatus 12 has an AV cable connector (not illustrated) on a rear surface of the housing 16, and by means of the connector, the game apparatus 12 is connected to a monitor (display) 26 via an AV cable 24. The monitor 26 is typically a color television receiver, and through the AV cable 24, a video signal from the game apparatus 12 is input to a video input terminal of the color television, and a sound signal is input to a sound input terminal thereof. Accordingly, a game image of a three-dimensional (3D) video game, for example, is displayed on the screen of the color television (monitor) 26, and a stereo game sound, such as a game music, a sound effect is output from integrated speakers 28.

Additionally, around the monitor 26 (upper side of the monitor 26 in this embodiment), a marker unit 30 having two infrared ray LEDs (markers) 30a and 30b is provided. The marker unit 30 is connected to the game apparatus 12 through a power source cable (not shown). Accordingly, the marker unit 30 is supplied with power from the game apparatus 12. The markers 30a and 30b emit and output infrared rays forward the monitor 26.

Furthermore, the power of the game apparatus 12 is applied by means of a general AC adapter (not illustrated). The AC adapter is connected to a standard wall outlet for home use, and transforms the house current to a low DC voltage signal suitable for driving the game apparatus 12. In another embodiment, a battery may be utilized as a power supply.

The controller 14, which is described in detail later, includes a first controller 34 and a second controller 36 each capable of being held with one hand and a gyro sensor unit 100 detachably attached to the first controller 34. On a rear end surface of the first controller 34, a connector 42 (FIG. 2(A), FIG. 11) is provided, and at an end of a cable 38 extending from the rear end of the second controller 36, a connector 40 (FIG. 1, FIG. 5, FIG. 11) is provided, and on a front end surface and a rear end surface of the gyro sensor unit 100, connectors 106 and 108 (FIG. 6(A), FIG. 6(B), FIG. 7 and FIG. 11) are respectively provided. The connector 106 at the front end surface of the gyro sensor unit 100 is connectable to the connector 42 of the first controller 34, and the connector 40 of the second controller 36 is connectable to the connector 42 of the first controller 34 or the connector 108 at the rear end surface of the gyro sensor unit 100.

By connecting the connector 106 to the connector 42, the gyro sensor unit 100 is physically and electrically connected to the first controller 34. From the gyro sensor unit 100 thus attached (connected as a single unit) to the first controller 34, angular velocity data indicating an angular velocity of the first controller 34 is output.

In a case that the gyro sensor unit 100 is thus attached to the first controller 34, the connector 40 of the second controller 36 is connected to the connector 108 at the rear end surface of the gyro sensor unit 100. That is, the connector 42 has a structure selectively connectable to either of the connector 106 or the connector 40, and the connector 40 has a structure of selectively connectable to either of the connector 42 or the connector 108. Accordingly, the connector 106 and the connector 108 provided to the gyro sensor unit 100 cannot actually be connected because of being a part of the same housing, but have shapes connectable with each other. Input data from the second controller 36 is applied to the first controller 34 via the cable 38 and the gyro sensor unit 100. The first controller 34 transmits controller data including input data from the first controller 34 itself, angular velocity data from the gyro sensor unit 100, and input data from the second controller 36 to the game apparatus 12.

Alternatively, in a case that the connector 40 is connected to the connector 42, operation data or input data from the second controller 36 are applied to the first controller 34 via the cable 38, and the first controller 34 transmits controller data including the input data from the first controller 34 itself and the input data from the second controller 36 to the game apparatus 12.

In the system here for transmitting the input data from the first controller 34 and the input data from the second controller 36, a data amount to be transmitted at a time may sometimes be designed so as not be added, but in a case that the gyro unit 100 is added, angular velocity data from the gyro unit 100 and input data from the second controller 36 are alternately output to the first controller 36, which allows both of the data to be transmitted. The data control can be performed by the gyro unit 100, so that the first controller 34 and the second controller 36 are not required to be changed in design.

Thus, the first controller 34 inputs by radio to the game apparatus 12 an operation signal and operation data (data) from the second controller 36 and the gyro sensor unit 100 as well as the operation signal and the operation data (data) from the controller 34 away from the game apparatus 12, and therefore, the first controller 34 may sometimes be called a "remote controller". Furthermore, the second controller 36 is called "Nunchaku" for the sake of its shape, and therefore, it may sometimes be called so.

Thus, the gyro sensor unit 100 is an expanding unit for adding a gyro function to the first controller 34 by utilizing the existing first controller 34 and second controller 36 as it is.

In the game system 10, a user first turns the power of the game apparatus 12 on for playing the game (or another application), then selects an appropriate optical disk 22 storing a video game (or another application the player wants to play), and loads the optical disk 22 into the disk drive 74 through the disk slot 18 of the game apparatus 12. In response thereto, the game apparatus 12 starts to execute a video game or another application on the basis of the software stored in the optical disk 22. The user operates the controller 14 in order to apply an input to the game apparatus 12.

FIGS. 2(A) and 2(B) show one example of an appearance of the remote controller or the first controller 34. FIG. 2(A) is a perspective view of the first controller 34 as seeing it from above rear, and FIG. 2(B) is a perspective view of the first controller 34 as seeing it from below front.

The first controller 34 has a housing 44 formed by plastic molding, for example. The housing 44 is formed into an approximately rectangular parallelepiped shape regarding a back and forth direction (Z-axis direction shown) as a longitudinal direction, and has a size small enough to be held by one hand of a child and an adult. As one example, the housing 44 has a length or a width approximately the same as that of a palm of a person. The player can perform a game operation by means of the first controller 34, that is, by pushing the buttons provided on it and by changing a position and a direction of the first controller 34 itself.

The housing 44 is provided with a plurality of operation buttons. That is, on the top surface of the housing 44, a cross key 46a, an 1 button 46b, a 2 button 46c, an A button 46d, a −(minus) button 46e, a home (HOME) button 46f, and a +(plus) button or start button 46g are provided. Meanwhile, on the bottom surface of the housing 44, a concave portion is formed, and on the reward inclined surface of the concave portion, a B button 46h is provided. Each of the buttons (switches) 46a-46h is assigned an appropriate function depending on a game program to be executed by the game apparatus 12. Furthermore, the housing 44 has a power switch 46i for turning on and off the power of the main body of the game apparatus 12 from a remote place on a top surface. The respective buttons (switches) provided on the first controller 34 may inclusively be indicated as an operating means or an input means with the use of the reference numeral 46.

The cross key 46a is a four directional push switch, including four directions of front (or upper), back (or lower), right and left operation parts. By operating any one of the operation parts, it is possible to instruct a moving direction of a character or an object (player character or player object) that is operable by a player, instruct the moving direction of a cursor, or merely instruct a direction.

The 1 button 46b and the 2 button 46c are respectively push button switches, and are used for a game operation, such as adjusting a viewpoint position and a viewpoint direction on displaying the 3D game image, i.e. a position and an image angle of a virtual camera. Alternatively, the 1 button 46b and the 2 button 46c can be used for the same operation as that of the A-button 46d and the B button 46h or an auxiliary operation.

The A-button switch 46d is the push button switch, and is used for causing the player character or the player object to take an action other than a directional instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth. Furthermore, in a case that the controller 34 is used as a pointing device, the A-button switch 46d is used to instruct a decision of an icon or a button image instructed by a pointer (instruction image) on the game screen. For example, when the icon or the button image is decided, an instruction or a command set in advance corresponding thereto can be input.

The – button 46e, the HOME button 46f, the + button 46g, and the power supply switch 46i are also push button switches. The – button 46e is used for selecting a game mode. The HOME button 46f is used for displaying a game menu (menu screen). The + button 46g is used for starting (resuming) or pausing the game. The power supply switch 46i is used for turning on/off a power supply of the game apparatus 12 by remote control. It should be noted that in this embodiment, a power switch for turning on and off the controller 34 itself is not furnished, and the controller 34 is turned on in response to any of the operating means and the input means 46 of the controller 34 being operated, and automatically turned off in response to no operation for a constant period (30 seconds, for example) and more.

The B button 46h is also the push button switch, and is mainly used for inputting a trigger such as shooting, and designating a position selected by the controller 34. In a case that the B button 46h is continued to be pushed, it is possible to make movements and parameters of the player object constant. In a fixed case, the B button 46h functions in the same way as a normal B-button, and is used for canceling an action and a command determined by the A-button 46d.

Figure 2:
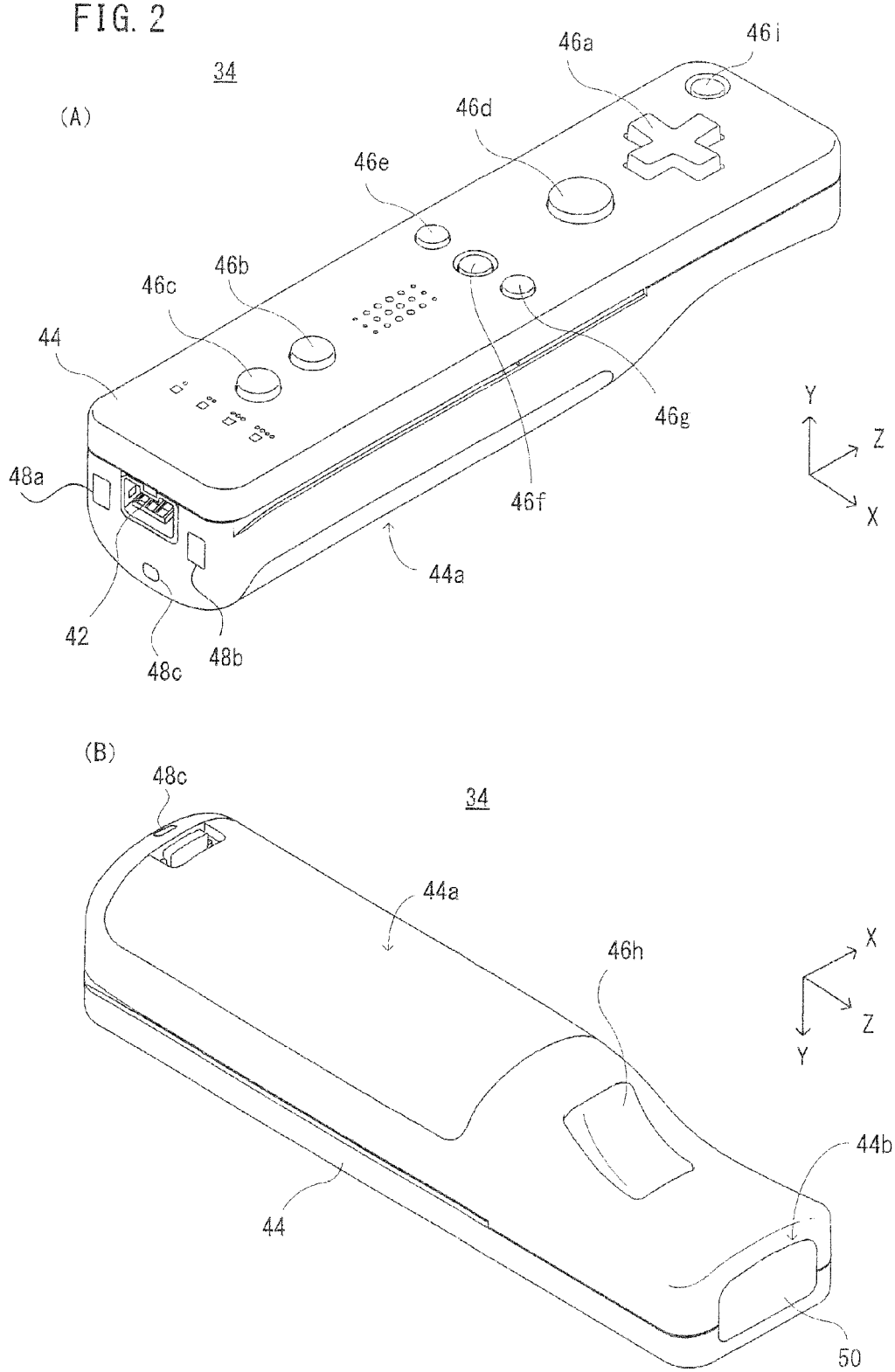
FIGS. 2(A) and 2(B) are an illustrative view showing an appearance of a first controller (remote controller) applied to FIG. 1 embodiment.

Within the housing 44, an acceleration sensor 84 (FIG. 11) for detecting accelerations in three-axis directions of X, Y and Z (that is, right and left direction, up and down direction and forward and reward direction) shown in FIG. 2 is provided. Alternatively, as an acceleration sensor 84, a two-axis acceleration sensor for detecting accelerations in any two directions out of the right and left direction, up and down direction and forward and reward direction may be used depending on the restriction on a shape of the housing 44, a way of holding the first controller 34, or the like. Under certain circumstances, a one-axis acceleration sensor may be used.

On the front surface of the housing 44, a light incident opening 44b is formed, and inside the housing 44, an imaged information arithmetic section 50 is further provided. The imaged information arithmetic section 50 is made up of a camera for imaging infrared rays and an arithmetic operation portion for calculating coordinates of imaged objects within an image, and captures an object scene including the above-described markers 30a and 30b by the infrared rays to calculate position coordinates of the markers 30a and 30b within the object scene.

On the rear surface of the housing 44, the above-described connector 42 is provided. The connector 42 is utilized for connecting other equipment to the first controller 34. In this embodiment, the connector 42 is connected with the connector 40 of the second controller 36 or the connector 106 of the gyro sensor unit 100.

Moreover, on the rear surface of the housing 44, a pair of through holes 48a and 48b is formed in such positions as to be symmetrically with each other (X-axis direction) about the connector 42. The pair of through holes 48a and 48b is for being inserted with hooks 112Fa and 112Fb (FIG. 6(A)) to securing the gyro sensor unit 100 at the rear surface of the housing 44. At the rear surface of the housing 44, a through hole 48c for attaching a strap 56 (FIG. 5) is also provided.

FIGS. 3(A) and 3(B) are an illustrative view showing one example of an appearance of the Nunchaku or the second controller 36 itself. FIG. 3(A) is a perspective view of the second controller 36 as seeing it from above rear, and FIG. 3(B) is a perspective view of the second controller 36 as seeing it from below front. In FIG. 3(B), the cable 38 of the second controller 36 is omitted.

The second controller 36 has a housing 52 formed by plastic molding, for example. The housing 52 is formed into an approximately thin long elliptical shape in the forward and backward direction (Z-axis direction) when viewed from plane, and the width of the right and left direction (X-axis direction) at the rear end is narrower than that of the front end. Furthermore, the housing 52 has a curved shape as a whole when viewed from a side, and downwardly curved from a horizontal portion at the front end to the rear end. The housing 52 has a size small enough to be held by one hand of a child and an adult similar to the first controller 34 as a whole, and has a longitudinal length (in the Z-axis direction) slightly shorter than that of the housing 44 of the first controller 34. Even with the second controller 36, the player can perform a game operation by operating buttons and a stick, and by changing a position and a direction of the controller itself.

At the front end of the top surface of the housing 52, an analog joystick 54a is provided. At the end of the housing 52, a front edge slightly inclined backward is provided, and on the front edge, a C button 54b and a Z button 54c are vertically (Y-axis direction in FIG. 3) provided. The analog joystick 54a and the respective buttons 54b and 54c are assigned appropriate functions according to a game program to be executed by the game apparatus 12. The analog joystick 54a and the respective buttons 54b and 54c provided to the second controller 36 may be inclusively denoted by means of the reference numeral 88.

Inside the housing 52 of the second controller 36, an acceleration sensor 86 (FIG. 11) is provided. As the acceleration sensor 86, an acceleration sensor similar to the acceleration sensor 84 in the first controller 34 is applied. More specifically, a three-axis acceleration sensor is applied in this embodiment, and detects accelerations in each of the three axis directions such as an up and down direction (Y-axial direction shown), a right and left direction (X-axial direction shown), and a forward and backward direction (Z-axial direction shown) of the second controller 36. Accordingly, similar to the case of the first controller 34, proper arithmetic process is performed on the detected accelerations to thereby calculate a tilt and a rotation of the second controller 36 and an attitude of the acceleration sensor 86 in the direction of gravity. Furthermore, it is possible to calculate a motion applied to the first controller 34 by swinging, etc. as with the case of the second controller 36.

Figure 4:
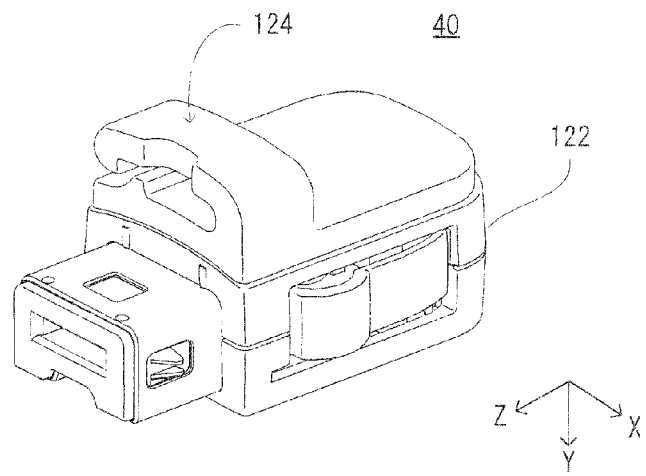
FIG. 4 is an illustrative view showing an appearance of a connector of the second controller.
Figure 5:
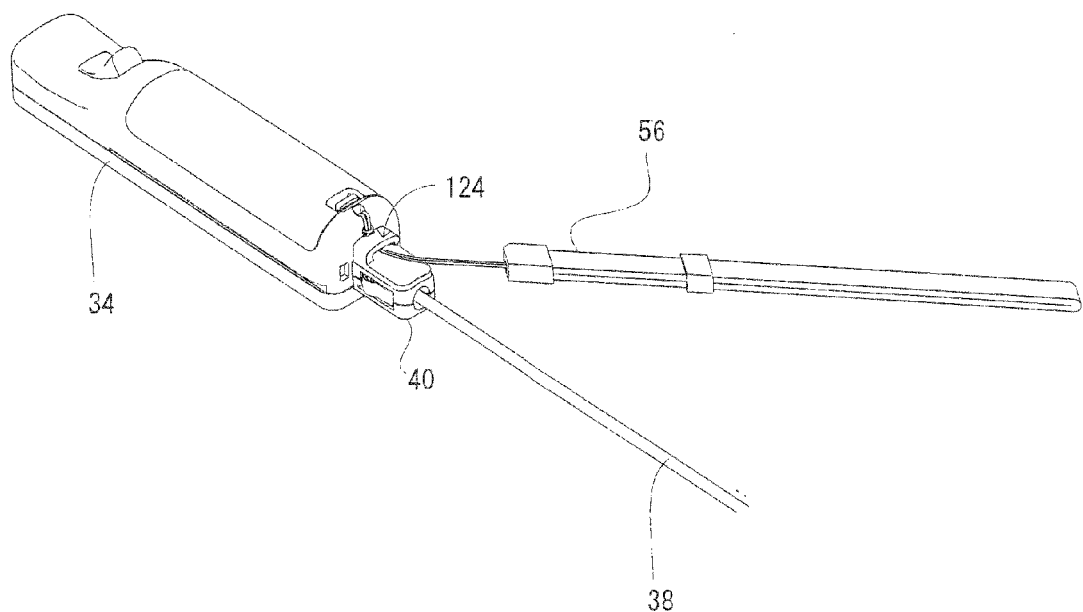
FIG. 5 is an illustrative view showing a manner in which a cord of a strap attached to the first controller is hung and retained with a hook of the connector in a state that the connector of the second controller is connected the first controller.

FIG. 4 shows one example of an appearance of the connector 40 of the second controller 36. FIG. 4 is a perspective view of the connector 40 as seeing it from below front. Here also, the cable 38 is omitted. The connector 40 has a housing 122 formed by a plastics molding, for example. At the bottom surface of the housing 122, a hook 124 is provided. The hook 124 is for intrinsically hanging and retaining a cord of the strap 56 attached to the first controller 34 when the connector 40 is directly connected to the first controller 34 (or the connector 42) as shown in FIG. 5. By hanging and retaining the cord of the strap 56 on the hook 144, it is possible to tightly secure the first controller 34 and the second controller 36.

FIGS. 6(A) and 6(B) show one example of an appearance of the gyro sensor unit 100. FIG. 6(A) is a perspective view of the gyro sensor unit 100 as seeing it from above front, and FIG. 6(B) is a perspective view of the gyro sensor unit 100 as seeing it from rear back.

The gyro sensor unit 100 has a housing 110 formed by a plastics molding, for example. The housing 110 has an appropriately rectangular parallelepiped shape, and the length is ⅕ of the length of the housing 44 of the first controller 34, and the width and thickness are approximately the same as those of the housing 44. The player can play a game operation by changing a position and a direction of the first controller 34 itself even if the first controller 34 is attached with the gyro sensor unit 100.

On the front surface and the rear surface of the housing 110, the above-described connectors 106 and 108 are respectively provided, on the side surfaces of the housing 110, a pair of release buttons 112a and 112b are provided, and the bottom surface of the housing 110, a lock switch 114 is provided. An approximately sphere concave portion 110a is provided from the end of the front surface of the housing 110 to the bottom surface such that the through hole 48c for the strap 56 is exposed in a state that the first controller 34 is attached with the gyro sensor unit 100 (FIG. 8).

The pair of release buttons 112a and 112b, and a pair of hooks 112Fa and 112Fb which are respectively associated with the release buttons 112a and 112b are provided on a front surface of the housing 110 at positions symmetrically with each other in a horizontal direction (X-axis direction) about the connector 106. When the connector 106 is connected to the connector 42 in order to attach the gyro sensor unit 100 to the first controller 34, the pair of hooks 112Fa and 112Fb is inserted to the pair of through holes 48a and 48b (FIG. 2(A)) at the rear surface of the housing 44, and the pawls of the hooks 112Fa and 112Fb are engaged with the inner wall of the housing 44. Thus, the gyro sensor unit 100 is fixed to the rear surface of the first controller 34.

Figure 8:
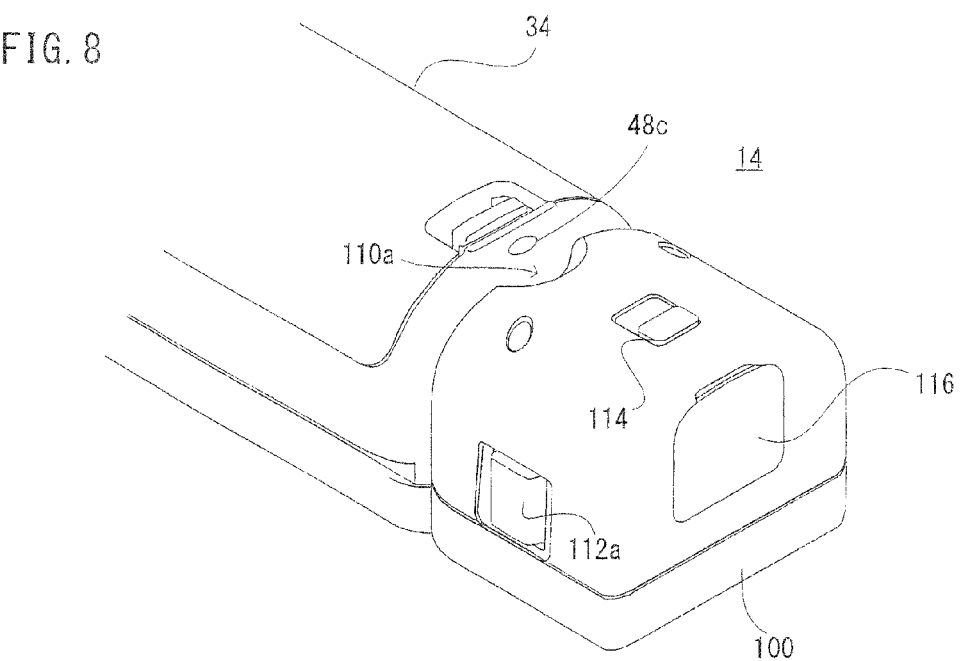
FIG. 8 is an illustrative view showing a state in which the gyro sensor unit is connected to the first controller.

FIG. 8 shows the gyro sensor unit 100 thus attached to the first controller 34. When the pair of release buttons 112a and 112b are pushed in this state, the engagement of the pawls are released to allow the gyro sensor unit 100 to be detached from the first controller 34.

A lock switch 114 is a sliding switch for locking such the release buttons 112a and 112b. The release buttons 112a and 112b cannot be pushed (locked state) when the lock switch 114 is in a first position (toward the rear side, for example), and the release buttons 112a and 112b can be pushed (released state) when the lock switch 114 is in a second position (toward the front, for example). Within the housing 110, locking springs 118a and 118b (FIG. 7) are provided and constructed so as to be repulsed when the release button 112a and 112b are pushed, and so as to maintain the engaged state when the release button 112a and 112b are not pushed. Thus, in order to remove the gyro sensor unit 100, the user has to push the release buttons 112a and 112b after sliding the lock switch 114 from the first position to the second position.

Since the gyro sensor unit 100 is attached to the rear surface of the first controller 34, a centrifugal force applied to the gyro sensor unit 100 during the game is exclusively worked such that the gyro sensor unit 100 is pressed against the first controller 34. Furthermore, the gyro sensor unit 100 is fixed to the rear surface of the first controller 34 by the hooks 112Fa and 112Fb while the lock switch 114 for releasing the hooks 112Fa and 112Fb is provided to the release buttons 112a and 112b, and therefore, even during operating the game, it is possible to bring about a tightly secured state between the gyro sensor unit 100 and the first controller 34.

On the rear surface of the housing 110, a concave portion 110b capable of housing the connector cover 116 to be attached to the connector 108 is provided on the periphery of the connector 108. The connector cover 116 has a narrow thin (that is, can be bended) protrusion 116a extending in a forward and backward (Z-axis direction) direction on the one end of the main surface. The end portion of the protrusion 116a is engaged with the housing 110, and the connector cover 116 is captive from the housing 110 in a state that it is removed from the connector 108.

Figure 9:
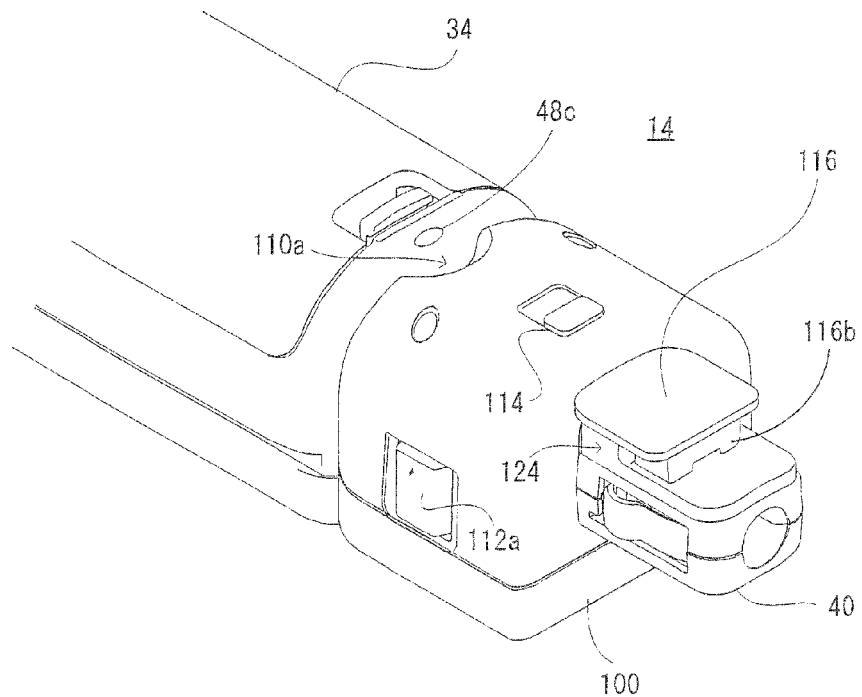
FIG. 9 is an illustrative view showing a state in which the second controller is connected to the first controller via the gyro sensor unit.

The connector cover 116 has a narrow thick (that is, is hard to bend) protrusion 116b extending in a right and left direction (X-axis direction) on the other end of the main surface. The thickness (height of the Z-axis direction) of the protrusion 116b is approximately the same as the thickness (height of the Y-axis direction) of the hook 124 (FIG. 4) provided to the connector 40 of the second controller 36. In a case that the second controller 36 is connected to the first controller 34 via the gyro sensor unit 100, the main surface of the connector cover 116 is made level to be engaged with the side surface of the hook 124 of the protrusion 116b as shown in FIG. 9. By thus incorporating the connector cover 116 detached from the connector 108 into the connector 40, the connector 40 is tightly secured to the gyro sensor unit 100 as well as is improved in operability and appearance.

Figure 7:
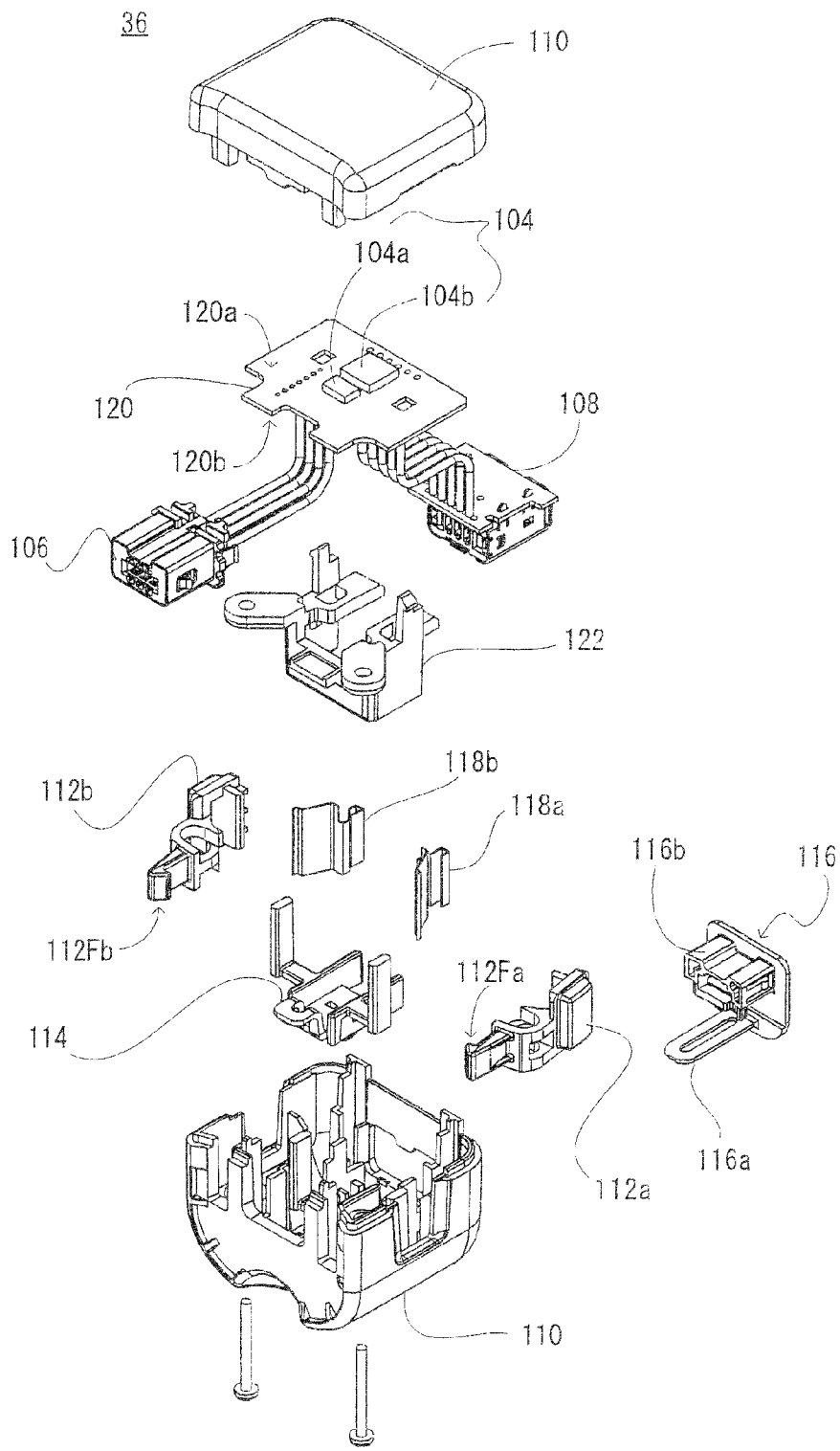
FIG. 7 is an illustrative view showing structure of the gyro sensor unit.

FIG. 7 shows one example of a structure of the gyro sensor unit 100. The gyro sensor unit 100 also has a gyro substrate 120 and a support member 122 in addition to the above-described housing 110, connectors 106 and 108, release buttons 112a and 112b, hooks 112Fa and 112Fb, lock switch 114, connector cover 116 and locking springs 118a and 118b. The gyro substrate 120 is connected to each of the connectors 106 and 108 by a signal wire, and the support member 122 supports the gyro substrate 120 and the connectors 106 and 108.

The gyro substrate 120 is provided with a gyro sensor 104. The gyro sensor 104 is made up of two chips including one-axis gyro sensor 104a and two-axis gyro sensor 104b. The gyro sensor 104a is for detecting an angular velocity (angular velocity about the Y axis) relating to a yaw angle, and the gyro sensor 104b is for detecting two angular velocities (angular velocity about the Z axis and angular velocity about the X axis) relating to a roll angle and a pitch angle. The gyro sensors 104a and 104b are arranged in parallel on a top surface 120a of the gyro substrate 120.

Here, the arrangement of the gyro sensors 104a and 104b is not restricted to that shown in FIG. 7. In another embodiment, the gyro sensor 104a is horizontally provided on one of the top surface 120a and the bottom surface 120b of the gyro substrate 120 while the gyro sensor 104b is horizontally provided on the other of the top surface 120a and the bottom surface 120b of the gyro substrate 120 so as to be opposed to the gyro sensor 104a with the gyro substrate 120 therebetween. In another embodiment, the gyro sensor 104a is vertically provided on one of the top surface 120a and the bottom surface 120b of the gyro substrate 120 while the gyro sensor 104b is horizontally provided on the other of the top surface 120a and the bottom surface 120b of the gyro substrate 120.

Furthermore, the gyro sensor 104 is not restricted to be made up of two chips, may be made up of three one-axis gyro sensors (three chips), or may be made up of one three-axis gyro sensor (one chip). In either case, a position and a direction of each of the chips are decided so as to properly detect the above-described three angular velocities. In addition, under certain circumstances, the gyro sensor 104 may be made up of one two-axis gyro sensor, or may be mad up of one or two one-axis gyro sensor.

It should be noted that the shapes of the first controller 34 shown in FIG. 2, the second controller 36 shown in FIG. 3 and FIG. 4 and the gyro sensor unit 100 shown in FIG. 6, and the shape, the number and the setting position of the button (switch or stick, etc.) are merely one example, and may be changed to another shape, number and setting position, etc. as necessary.

Here, the sensor is a gyro sensor (angular velocity sensor) in a preferred embodiment, but may be other motion sensors, such as an acceleration sensor, a velocity sensor, a displacement sensor, a rotation angle sensor, etc. Other than the motion sensors, there are a slant sensor, an image sensor, an optical sensor, a pressure sensor, a magnetic sensor, a temperature sensor, etc., and in a case that either sensor is added, an operation by utilizing an object to be detected of the sensor is made possible. In a case that either sensor is utilized, the operating device can be added with the sensor while utilizing another device conventionally connected to the operating device as it is.

In addition, the power source of the controller 14 is applied by a battery (not illustrated) which is replaceably accommodated in the first controller 34. The power is supplied to the second controller 36 via the connector 40 and the cable 38. If the gyro sensor unit 100 is connected to the first controller 34, the power is supplied to the gyro sensor unit 100 via the connectors 42 and 106. Alternatively, if the second controller 36 is connected to the gyro sensor unit 100, a part of the power supplied from the first controller 34 to the gyro sensor unit 100 is also applied to the second controller 36 via the connector 108, the connector 40 and the cable 38.

Figure 10:
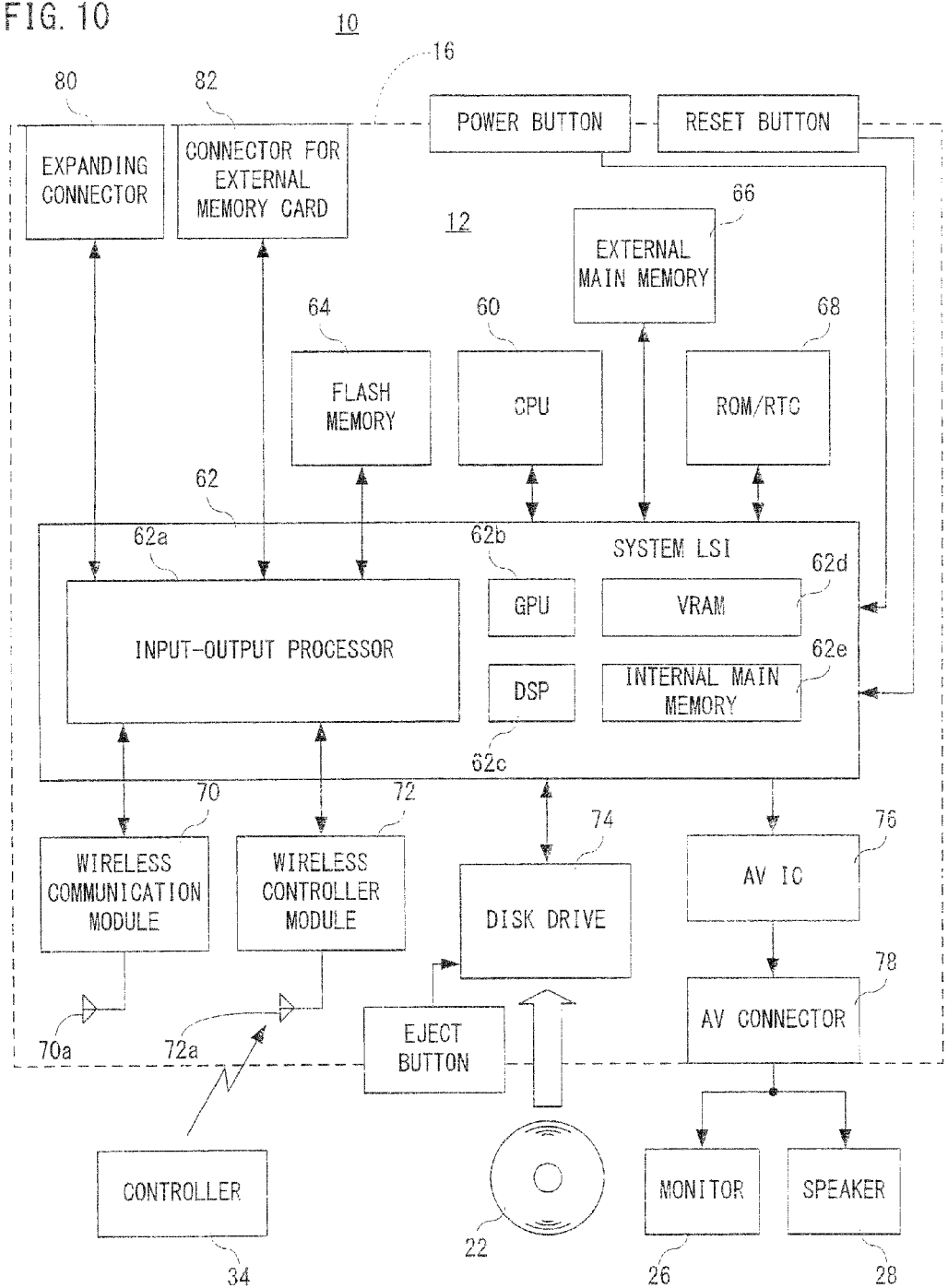
FIG. 10 is a block diagram showing an electric configuration of FIG. 1 embodiment.

FIG. 10 shows a block diagram showing an electric configuration of the video game system 10 in FIG. 1 embodiment. Although illustration is omitted, respective components within the housing 16 are mounted on the printed-circuit board. As shown in FIG. 10, the game apparatus 12 is provided with a CPU 44 functioning as a game processor. Furthermore, the CPU 44 is also connected with a system LSI 62. The system LSI 62 is connected with an external main memory 46, a ROM/RTC 48, a disk drive 54 and an AV IC 56.

The external main memory 66 is utilized as a work area and a buffer area of the CPU 60 by storing programs such as a game program, etc. and various data. The ROM/RTC 68, which is a so-called boot ROM, is incorporated with a program for activating the game apparatus 12, and is provided with a time circuit for counting a time. The disk drive 74 reads program, image data, sound data, etc. from the optical disk 18, and writes them in an internal main memory 62e described later or the external main memory 66 under the control of the CPU 60.

The system LSI 62 is provided with an input-output processor 62a, a GPU (Graphics Processor Unit) 62b, a DSP (Digital Signal Processor) 62c, a VRAM 62d and an internal main memory 62e, and these are connected with one another by internal buses although illustration is omitted. The input-output processor (I/O processor) 62a executes transmission and reception of data and executes download of the data. The transmitting and receiving the data and downloading the data are described in detail later.

The GPU 62b is made up of a part of a drawing means, and receives a graphics command (construction command) from the CPU 60 to generate game image data according to the command. Additionally, the CPU 60 applies an image generating program required for generating game image data to the GPU 62b in addition to the graphics command.

Although illustration is omitted, the GPU 62b is connected with the VRAM 62d as described above. The GPU 62b accesses the VRAM 62d to acquire data (image data: data such as polygon data, texture data, etc.) required to execute the construction command. Here, the CPU 60 writes image data required for drawing to the VRAM 62d via the GPU 62b. The GPU 62b accesses the VRAM 62d to produce game image data for drawing.

In this embodiment, a case that the GPU 62b generates game image data is explained, but in a case of executing an arbitrary application except for the game application, the GPU 62b generates image data as to the arbitrary application.

Furthermore, the DSP 62c functions as an audio processor, and generates audio data corresponding to a sound, a voice, music, or the like to be output from the speaker 28 by means of the sound data and the sound wave (tone) data stored in the internal main memory 62e and the external main memory 66.

The game image data and audio data which are generated as described above are read by the AV IC 76, and output to the monitor 26 and the speaker 28 via the AV connector 78. Accordingly, a game screen is displayed on the monitor 26, and a sound (music) necessary for the game is output from the speaker 28.

Furthermore, the input-output processor 62a is connected with a flash memory 64, a wireless communication module 70 and a wireless controller module 72, and is also connected with an expanding connector 80 and a connector for external memory card 82. In addition, the wireless communication module 70 is connected with an antenna 70a, and the wireless controller module 72 is connected with an antenna 72a.

Although illustration is omitted, the input-output processor 62a can communicate with other game apparatuses and various servers to be connected to a network via the wireless communication module 70. It should be noted that it is possible to directly communicate with another game apparatus without going through the network. The input-output processor 62a periodically accesses the flash memory 64 to detect the presence or absence of data (referred to as data to be transmitted) being required to be transmitted to a network, and transmits it to the network via the wireless communication module 70 and the antenna 70a in a case that data to be transmitted is present. Furthermore, the input-output processor 62a receives data (referred to as received data) transmitted from another game apparatuses via the network, the antenna 70a and the wireless communication module 70, and stores the received data in the flash memory 64. In a case that the received data does not satisfy a constant condition, the received data is abandoned as it is. In addition, the input-output processor 62a receives data (download data) downloaded from the download server via the network, the antenna 70a and the wireless communication module 70, and stores the download data in the flash memory 64.

Furthermore, the input-output processor 62a receives input data transmitted from the controller 34 via the antenna 72a and the wireless controller module 72, and (temporarily) stores it in the buffer area of the internal main memory 62e or the external main memory 66. The input data is erased from the buffer area after being utilized in the processing by the CPU 60 (game processing, for example).

In this embodiment, as described above, the wireless controller module 72 makes communications with the controller 34 in accordance with the Bluetooth standard. This makes it possible for the game apparatus 12 to not only fetch data from the controller 14 but also to transmit a predetermined command to the controller 14 and control a motion of the controller 14 from the game apparatus 12.

In addition, the input-output processor 62a is connected with the expanding connector 80 and the connector for external memory card 82. The expanding connector 80 is a connector for interfaces, such as USB, SCSI, etc., and capable of connecting medium such as an external storage and peripheral devices such as another controller different form the controller 34. Furthermore, the expanding connector 80 is connected with a cable LAN adaptor, and capable of utilizing the cable LAN in place of the wireless communication module 70. The connector for memory card 82 can be connected with an external storage like a memory card. Thus, the input-output processor 62a, for example, accesses the external storage via the expanding connector 80 and the connector for external memory card 82 to store and read the data in and from the same.

Although detailed explanation is omitted, when the power button is turned on, the system LSI 62 set in a mode of a normal energized state in which the respective components of the game apparatus 12 are supplied with power through an AC adapter not shown (referred to as "normal mode"). On the other hand, when the power button is turned off, the system LSI 62 is set to a mode in which only a part of the components of the game apparatus 12 is supplied with power, and the power consumption is reduced to minimum (hereinafter referred to as a "standby mode").

In this embodiment, in a case that the standby mode is set, the system LSI 62 issues an instruction to stop supplying the power to the components except for the input-output processor 62a, the flash memory 64, the external main memory 66, the ROM/RTC 68, the radio communication module 70, and the radio controller module 72. Accordingly, in this embodiment, in the standby mode, the CPU 60 never performs an application.

Although the system LSI 62 is supplied with power even in the standby mode, generation of clocks to the GPU 62b, the DSP 62c and the VRAM 62d are stopped so as not to be driven, realizing reduction in power consumption.

Although illustration is omitted, inside the housing 14 of the game apparatus 12, a fan is provided for excluding heat of the IC, such as the CPU 60, the system LSI 62, etc. to outside. In the standby mode, the fan is also stopped.

However, in a case that the standby mode is not desired to be utilized, the standby mode is made unusable to thereby completely stop the power supply to all the circuit components when the power button is turned off.

Furthermore, switching between the normal mode and the standby mode can be performed by turning on and off the power switch 80i of the controller 34 by remote control. If the remote control is not performed, setting is made such that the power supply to the radio controller module 72a is not performed in the standby mode.

The reset button is also connected with the system LSI 62. When the reset button is pushed, the system LSI 62 restarts the activation program of the game apparatus 12. The eject button is connected to the disk drive 74. When the eject button is pushed, the optical disk 22 is removed from the disk drive 74.

Figure 11:
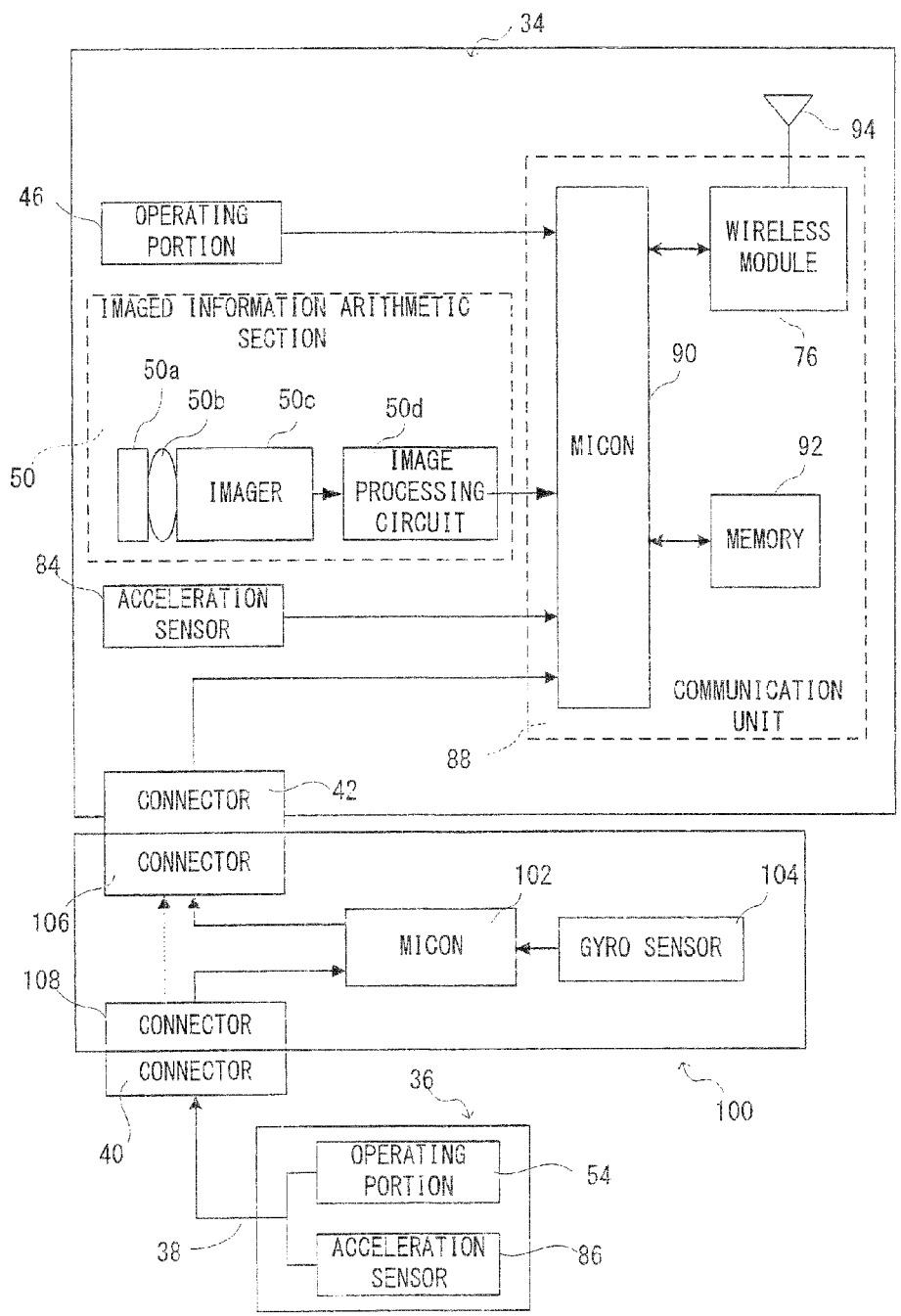
FIG. 11 is a block diagram showing an electric configuration of all the controllers applied to FIG. 1 embodiment.

FIG. 11 shows one example of an electric configuration of the controller 14 as a whole when the first controller 34 and the second controller 36 are connected via the gyro sensor unit 100.

The first controller 34 includes a communication unit 88, and the communication unit 88 is connected with the operating portion 46, the imaged information arithmetic section 50, the acceleration sensor 84, and the connector 42. The operating portion 46 indicates the above-described operation buttons or operation switches 46a-46i. When the operating portion 46 is operated, data indicating the operation is applied to the communication unit 88. From the imaged information arithmetic section 50, data indicating the position coordinates of the markers 30a and 30b within the object scene is output to the communication unit 88.

In addition, as described above, the controller 34 is provided with the imaged information arithmetic section 50. The imaged information arithmetic section 50 is made up of an infrared rays filter 50a, a lens 50b, an imager 50c, and an image processing circuit 50d. The infrared rays filter 50a passes only infrared rays from the light incident from the front of the controller 34. As described above, the markers 30a and 30b placed near (around) the display screen of the monitor 26 are infrared LEDs for outputting infrared lights forward the monitor 26. Accordingly, by providing the infrared rays filter 50a, it is possible to image the image of the markers 30a and 30b more accurately. The lens 50b condenses the infrared rays passing thorough the infrared rays filter 50a to emit them to the imager 50c. The imager 50c is a solid imager, such as a CMOS sensor and a CCD, for example, and images the infrared rays condensed by the lens 50b. Accordingly, the imager 50c images only the infrared rays passing through the infrared rays filter 50a to generate image data. Hereafter, the image imaged by the imager 50c is called an "imaged image". The image data generated by the imager 50c is processed by the image processing circuit 50d. The image processing circuit 50d calculates positions of objects to be imaged (markers 30a and 30b) within the imaged image, and outputs each coordinate value indicative of the position to the processor 70 as imaged data (marker coordinate data to be described later) for each fourth predetermined time. It should be noted that a description of the process in the image processing circuit 50d is made later.

Figure 12:
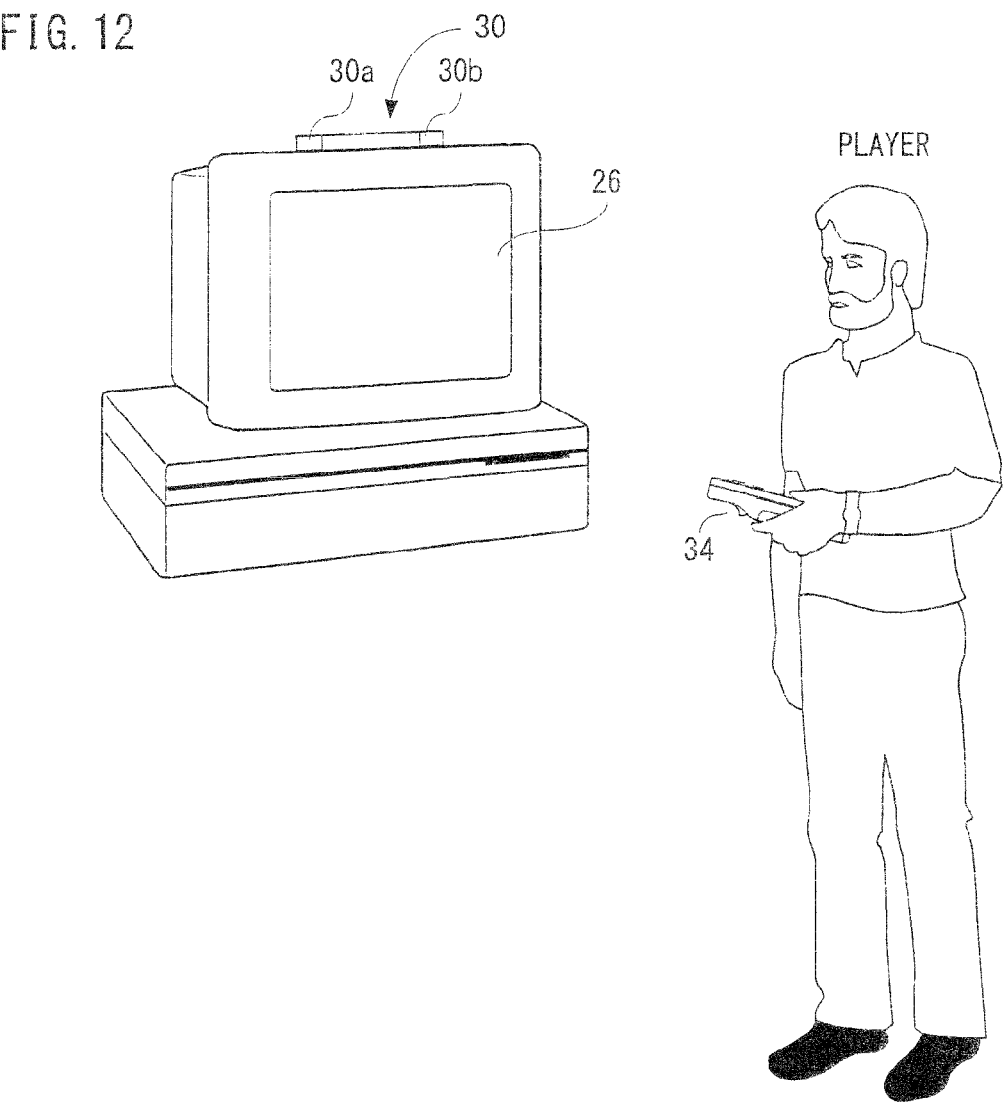
FIG. 12 is an illustrative view showing a state in which a game is played by utilizing the controller connected with the gyro unit shown in FIG. 1.

FIG. 12 is an illustrative view summarizing a state when a player plays a game by utilizing the controller 34. It should be noted that the same is true for a case that another application is executed or a DVD is reproduced as well as a game playing. As shown in FIG. 12, when playing the game by means of the controller 34 in the video game system 10, the player holds the controller 34 with one hand. Strictly speaking, the player holds the controller 34 in a state that the front end surface (the side of the incident light opening 44b of the light imaged by the imaged information arithmetic section 50) of the controller 34 is oriented to the markers 30a and 30b. It should be noted that as can be understood from FIG. 1, the markers 30a and 30b are placed in parallel with the horizontal direction of the screen of the monitor 26. In this state, the player performs a game operation by changing a position on the screen indicated by the controller 34, and changing a distance between the controller 34 and each of the markers 30a and 30b.

Although it is difficult to view in FIG. 12, this is true for a case that the gyro unit 100 described above is connected to the controller 34.

Figure 13:
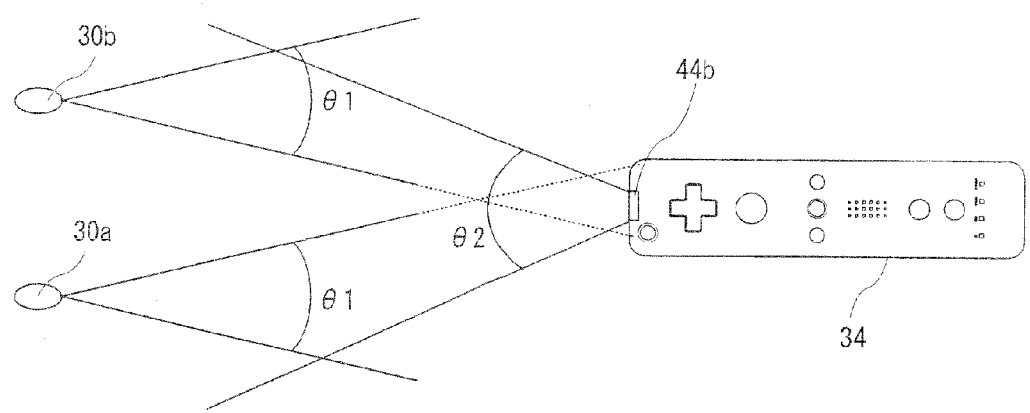
FIG. 13 is an illustrative view explaining viewing angles of markers and the controller shown in FIG. 1.

FIG. 13 is a view showing viewing angles between the respective markers 30a and 30b, and the controller 34. As shown in FIG. 13, each of the markers 30a and 30b emits infrared ray within a range of a viewing angle $\theta 1$. Also, the imager 50c of the imaged information arithmetic section 50 can receive incident light within the range of the viewing angle $\theta 2$ taking the line of sight of the controller 34 as a center. For example, the viewing angle $\theta 1$ of each of the markers 30a and 30b is 34° (half-value angle) while the viewing angle $\theta 2$ of the imager 50c is 41°. The player holds the controller 34 such that the imager 50c is directed and positioned so as to receive the infrared rays from the markers 30a and 30b. More specifically, the player holds the controller 34 such that at least one of the markers 30a and 30b exists in the viewing angle $\theta 2$ of the imager 50c, and the controller 34 exists in at least one of the viewing angles $\theta 1$ of the marker 30a or 30b. In this state, the controller 34 can detect at least one of the markers 30a and 30b. The player can perform a game operation by changing the position and the attitude of the controller 34 in the range satisfying the state.

Here, if the position and the attitude of the controller 34 are out of the range, the game operation based on the position and the attitude of the controller 34 cannot be performed. The above-described range is called an "operable range" hereafter.

Figure 14:
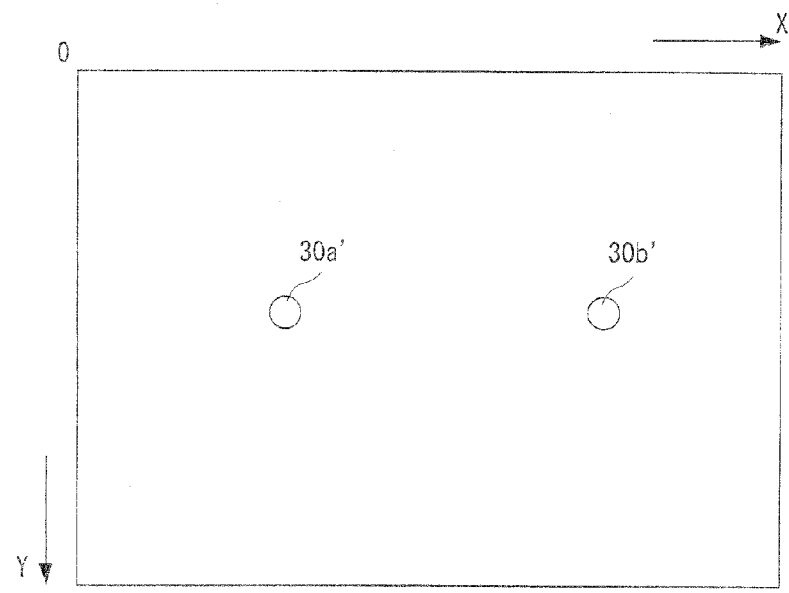
FIG. 14 is an illustrative view showing one example of an imaged image including object images.

If the controller 34 is held within the operable range, an image of each of the markers 30a and 30b is imaged by the imaged information arithmetic section 50. That is, the imaged image obtained by the imager 50c includes an image (object image) of each of the markers 30a and 30b as an object to be imaged. FIG. 14 is a view showing one example of the imaged image including the object images. The image processing circuit 80d calculates coordinates (marker coordinates) indicative of the position of each of the markers 30a and 30b in the imaged image by utilizing the image data of the imaged image including the object images.

Since the object image appears as a high-intensity part in the image data of the imaged image, the image processing circuit 50d first detects the high-intensity part as a candidate of the object image. Next, the image processing circuit 50d determines whether or not the high-intensity part is the object images on the basis of the size of the detected high-intensity part. The imaged image may include images other than the object images due to sunlight through a window and light of a fluorescent lamp in the room as well as the images 30a' and 30b' corresponding to the two markers 30a and 30b as the object images. The determination processing whether or not the high-intensity part is the object images is executed for discriminating the images 30a' and 30b' of the two markers 30a and 30b as the object images from the images other than them, and accurately detecting the object images. More specifically, in the determination process, it is determined whether or not the detected high-intensity part is within the size of a preset predetermined range. Then, if the high-intensity part is within the size of the predetermined range, it is determined that the high-intensity part represents the object images. On the contrary, if the high-intensity part is not within the size of the predetermined range, it is determined that the high-intensity part represents the images other than the object images.

In addition, as to the high-intensity part which is determined to represent the object images as a result of the above-described determination processing, the image processing circuit 50d calculates the position of the high-intensity part. More specifically, the barycenter position of the high-intensity part is calculated. Here, the coordinates of the barycenter position is called a "marker coordinate". Also, the barycenter position can be calculated with more detailed scale than the resolution of the imager 50c. Now, the resolution of the imaged image imaged by the imager 50c shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is properly detected, two high-intensity parts are determined as the object images by the determination process, and therefore, two marker coordinates are calculated. The image processing circuit 50d outputs data indicative of the calculated two marker coordinates. The data of the output marker coordinates (marker coordinate data) is included in the input data by the processor 70 as described above, and transmitted to the game apparatus 12.

The game apparatus 12 (CPU 60) detects the marker coordinate data from the received input data to thereby calculate an instructed position (instructed coordinate) by the controller 34 on the screen of the monitor 26 and a distances from the controller 34 to each of the markers 30a and 30b on the basis of the marker coordinate data. More specifically, from the position of the mid point of the two marker coordinates, a position to which the controller 34 faces, that is, an instructed position is calculated. The distance between the object images in the imaged image is changed depending on the distance between the controller 34 and each of the markers 30a and 30b, and therefore, the game apparatus 12 can grasp the distance between the controller 34 and each of the markers 30a and 30b by calculating the distance between the two marker coordinates.

Returning to FIG. 11, the data indicating the acceleration detected by the acceleration sensor 84 is also output to the communication unit 88. The acceleration sensor 84 has a sampling period being in the order of 200 frames/seconds at the maximum, for example.

The connector 42 is connected with the connector 106 of the gyro sensor unit. The gyro sensor unit 100 includes a microcomputer 102 and the gyro sensor 104 inside thereof. The gyro sensor 104 shows the above-described gyro sensors 104a and 104b, and has a sampling period similar to the acceleration sensor 84, for example. The microcomputer 102 outputs to the communication unit 88 data indicating the angular velocity detected by the gyro sensor 104 via the connector 106 and the connector 42.

The connector 108 of the gyro sensor unit 100 is connected with the connector 40 of the cable 38 extending from the second controller 36. The connector 40 is connected with an operating portion 88 and an acceleration sensor 86 of the second controller 36. The operating portion 88 shows the above-described stick 54a and operation buttons 54b, 54c. When the operating portion 54 is operated, data indicating the operation is applied to the microcomputer 102 of the gyro sensor unit 100 via the cable 38, the connector 40 and the connector 42. The microcomputer 102 outputs the data to the communication unit 88 via the connector 106 and the connector 42. The acceleration sensor 86 also has a sampling period similar to the acceleration sensor 84, and the data indicating the acceleration thus detected is also output to the communication unit 88 by the microcomputer 102.

Here, each output to the above-described communication unit 88 is executed at a cycle of 1/200 seconds. Accordingly, during arbitrary 1/200 seconds, operation data from the operating portion 46, position coordinate data from the imaged information arithmetic section 50, acceleration data from the acceleration sensor 84, angular velocity data from the gyro sensor 104, operation data from the operating portion 54, and acceleration data from the acceleration sensor 86 are output to the communication unit 88 once for each of them.

Figure 15:
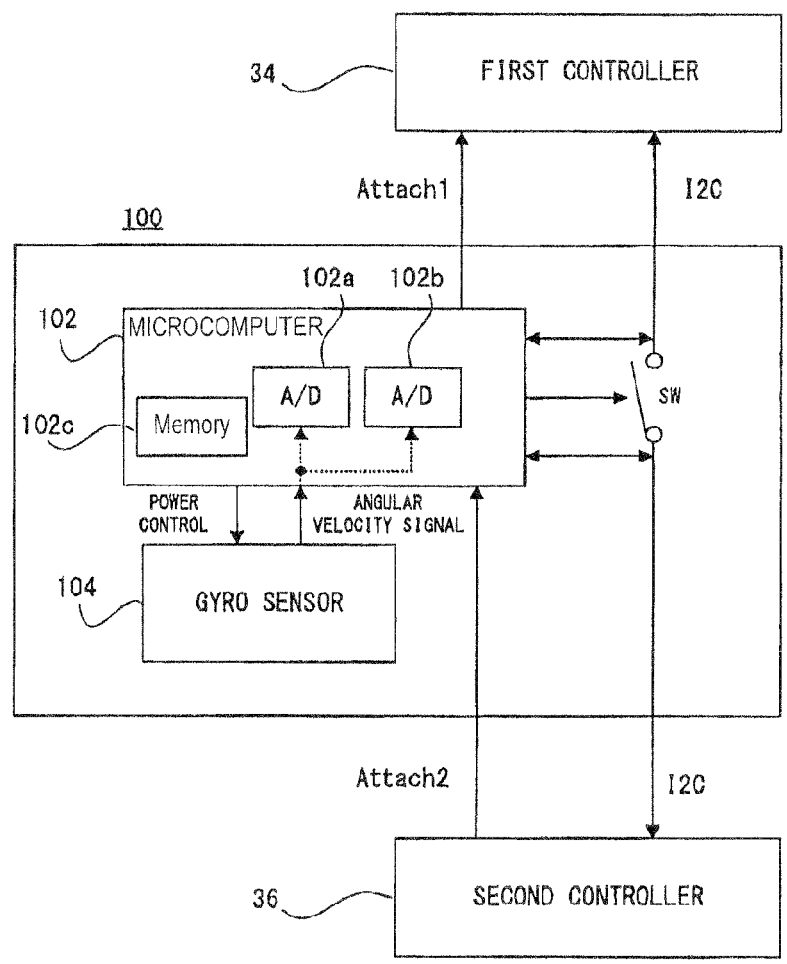
FIG. 15 is a block diagram showing an electric configuration of the gyro sensor unit which is placed between the first controller and the second controller in the controllers shown in FIG. 11.

FIG. 15 shows an important part of the gyro sensor unit 100 of the entire configuration shown in FIG. 11. Each of the above-described connector 42, connector 106, connector 108 and connector 40 is a connector of six pins, for example, in which an Attach pin for controlling a variable "Attach" indicating a connected state between the connectors is included. The Attach is changed between "Low" indicating that the connectors are not connected, and "High" indicating that the connectors are connected. In what follows, the Attach between the connector 42 and the connector 106, that is, between the first controller 34 and the gyro sensor unit 100 is called "Attach1", and the Attach between the connector 108 and the connector 40, that is, the gyro sensor unit 100 and the second controller 36 is called "Attach2".

Even if the first controller 34 is attached with the gyro sensor unit 100, if the application is a gyro-incompatible type, and the gyro sensor unit 100 is not connected with the second controller 36, the Attach1 is controlled to be "Low" such that the gyro sensor unit 100 is not viewed from the gyro-incompatible application by the microcomputer 102 of the gyro sensor unit 100 (standby mode: see FIG. 14). In the standby mode, a power supply to the gyro sensor 104 is stopped to make the gyro function inactive. The microcomputer 102 exclusively performs a mode selection based on the Attach2 and a power source management based on an instruction from the gyro-compatible application.

The other two pins out of the aforementioned six pins are assigned I2C buses, and the gyro sensor unit 100 further includes a bus switch SW for connecting/isolating the I2C bus on the side of the first controller 34 and the I2C bus on the side of the second controller 36. The bus switch SW is turned on by the microcomputer 102 when the gyro-incompatible application is executed in a state that the second controller 36 is connected to the first controller 34 via the gyro sensor unit 100. Thereafter, the data from the second controller 36 is output to the communication unit 88 through the I2C bus without passing through the microcomputer 102 (bypass mode: see FIG. 14). Thus, the microcomputer 102 merely performs a mode selection and a power source management similar to the standby mode, which reduces electric power consumption. Furthermore, the gyro-incompatible application can be executed even if the gyro sensor unit 100 is attached. When the bus switch SW is turned off, the bus is connected to the microcomputer 102, and the data to be output to the first controller 34 is controlled by the microcomputer 102.

The bus switch SW is turned on even in the standby mode. This makes it possible for the gyro-compatible type application to confirm whether or not the first controller 34 is attached with the gyro sensor unit 100 with reference to a special address of the I2C bus even if the Attach1 is controlled to "Low" as described above.

It should be noted that the gyro sensor unit 100 is prepared with four modes including a "gyro" mode and a "gyro & second controller" mode in addition to the above-described "standby" and "bypass" modes. In the former two modes, the bus switch SW is turned off.

The microcomputer 102 of the gyro sensor unit 100 includes two kinds of A/D conversion circuits 102a and 102b, and the angular velocity signals about the three axes output from the gyro sensor 104 are applied to each of the A/D conversion circuits 102a and 102b. In the A/D conversion circuit 102a, A/D converting processing of a high angular velocity mode for regarding all the detection range by the gyro sensor 104 (±360°/sec) as a target, for example, is executed, and in the A/D conversion circuit 102b, A/D converting processing of a low angular velocity mode for regarding a part of the detection range by the gyro sensor 104 (±90°/sec, for example) as a target is executed. The microcomputer 102 outputs any one of the two kinds results of the A/D transformation as angular velocity data.

More specifically, when two kinds of angular velocity data corresponding to a certain time are output from the A/D conversion circuits 102a and 102b, the microcomputer 102 first determines whether or not with respect to the angular velocity data of the low angular velocity mode, the value A falls within the range of a first threshold value Th1 to a second threshold value Th2 (>Th1), that is, a condition "Th1≤A≤Th2" is satisfied, for each of the axis, that is, the yaw axis, the roll axis, and the pitch axis. Next, on the basis of these three determination results, any one of the low angular velocity mode and the high angular velocity mode is selected. For example, with respect to each of the three determination results, if "YES", the low angular velocity mode is selected for each axis, and if "NO", the high angular velocity mode is selected for each axis. Then, the angular velocity data according to the mode selected for each axis is output along with the mode information indicating the selected mode. That is, by changing accuracy of the data depending on the angular velocity, it is possible to output data with high accuracy at low speeds even if the data amount is equal.

FIGS. 16(A) and 16(B) show a data format handled by the gyro sensor unit 100. FIG. 16(A) shows a data format for gyro sensor unit 100, and FIG. 13(B) shows a data format for second controller 36. The data for gyro sensor unit 100 includes yaw angular velocity data, roll angular velocity data and pitch angular velocity data, and yaw angular velocity mode information, roll angular velocity mode information and pitch angular velocity mode information, and second connector connection information and gyro/second controller identifying information.

Figure 17:
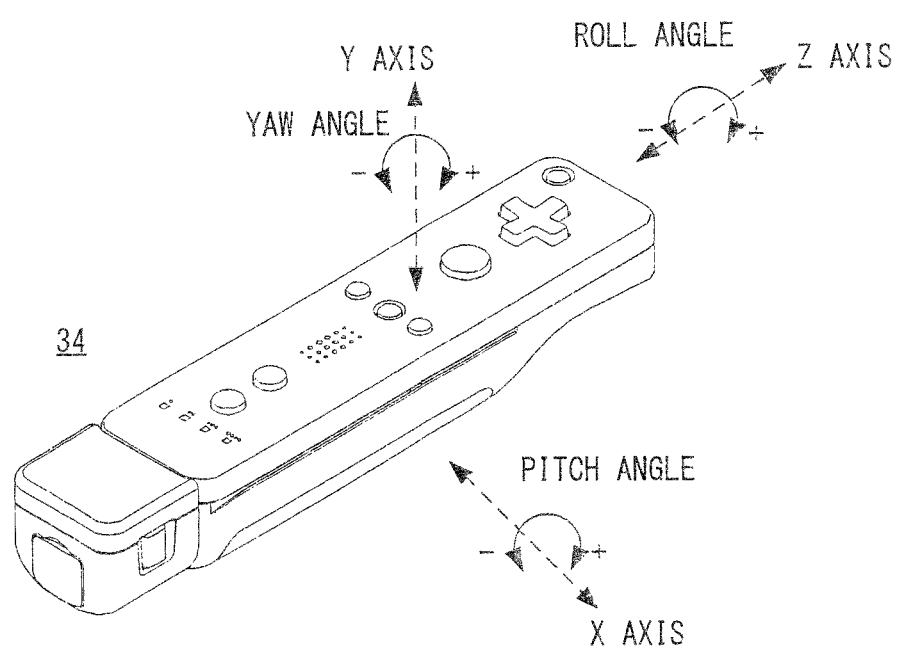
FIG. 17 is an illustrative view showing a yaw angle, a pitch angle, and a roll angle which are detectable by the gyro sensor.

Here, as shown in FIG. 17, the rotation about the Y axis is represented by a yaw angle, the rotation about X axis is represented by a pitch angle, and the rotation about Z axis is represented by a roll angle.

The yaw angular velocity data, the roll angular velocity data and the pitch angular velocity data, each of which is 14 bits data, for example, are respectively obtained, through an A/D conversion, from a yaw angular velocity signal, a roll angular velocity signal and a pitch angular velocity signal which are output from the gyro sensor 104. Each of the yaw angular velocity mode information, the roll angular velocity mode information and the pitch angular velocity mode information is information of one bit indicating a corresponding mode of each of the angular velocity data, and changed between "0" corresponding to the high angular velocity mode and "1" corresponding to the low angular velocity mode.

The second controller connection information is information of one bit to indicate whether or not the second controller 36 is connected to the connector 106, and is changed between "0" indicating a non-connection and "1" indicating a connection. The gyro/second controller identifying information is information of one bit to identify whether the data is data output from the gyro sensor unit 100 or the data output from the second controller 36, and is changed between "1" indicating that this is from the gyro sensor unit 100 and "0" indicating that this is from the second controller 36.

On the other hand, the data for second controller 36 includes X stick operation data and Z stick operation data respectively indicating a stick operation in the right and left direction (X-axis direction) and a stick operation in the forward and reward direction (Z-axis direction), and X acceleration data, Y acceleration data and Z acceleration data respectively indicating an acceleration in the X-axis direction, an acceleration in the Y-axis direction and an acceleration in the Z-axis direction, and button operation data, second connector connection information, and gyro/second controller identifying information.

The gyro sensor unit 100 alternately outputs data for gyro according to the format shown in FIG. 16(A) and data for second controller according to the format shown in FIG. 16(B) to the communication unit 88 at a cycle of 1/200 seconds, for example. Accordingly, the data in the one of the format is consequently output at a cycle of 1/100 seconds, but this is much shorter than the cycle of 1/60 seconds as a general processing period for game processing, etc., and therefore, even if the data is alternately output, both of the data can be used for one frame at the same time in the game processing.

The communication unit 88 shown in FIG. 11 includes a microcomputer (micon) 90, a memory 92, a wireless module 94, and an antenna 96. The micon 90 transmits the obtained data to the game apparatus 12 and receives data from the game apparatus 12 by controlling the wireless module 94 while using the memory 92 as a memory area (working area and buffer area) in processing.

The data output to the communication unit 88 from the gyro sensor unit 100 is temporarily stored in the memory 92 through the microcomputer 90. The data output to the communication unit 88 from the operating portion 46, the imaged information arithmetic section 50 and the acceleration sensor 84 within the first controller 34 are also temporarily stored in the memory 92. The microcomputer 90 outputs data stored in the memory 92 to the wireless module 94 as controller data when a transmission timing to the game apparatus 12 has come. The controller data includes the data for first controller in addition to the data for gyro and/or the data for second controller shown in FIG. 16(A) and FIG. 16(B). The data for first controller includes X acceleration data, Y acceleration data and Z acceleration data based on an output from the acceleration sensor 84, position coordinate data based on an output from the imaged information arithmetic section 50, and button operation data (key data) based on an output from the operating portion or the input means 46.

The wireless module 94 modulates a carrier at a predetermined frequency by the controller data, and emits its weak radio wave signal from the antenna 96 by using a short-range wireless communication technique, such as Bluetooth (trademarks). Namely, the controller data is modulated to the weak radio wave signal by the wireless module 94 and transmitted from the first controller 34. The weak radio wave signal is received by the Bluetooth communication unit 74 of the game apparatus 12. The weak radio wave thus received is subjected to demodulating and decoding processing, so that the game apparatus 12 can obtain the controller data. The CPU 60 of the game apparatus 12 performs the game processing on the basis of the controller data obtained from the controller 14. Here, the wireless communication between the first controller 34 and the game apparatus 12 may be executed according to another standard, such as a wireless LAN, etc.

Figure 18:
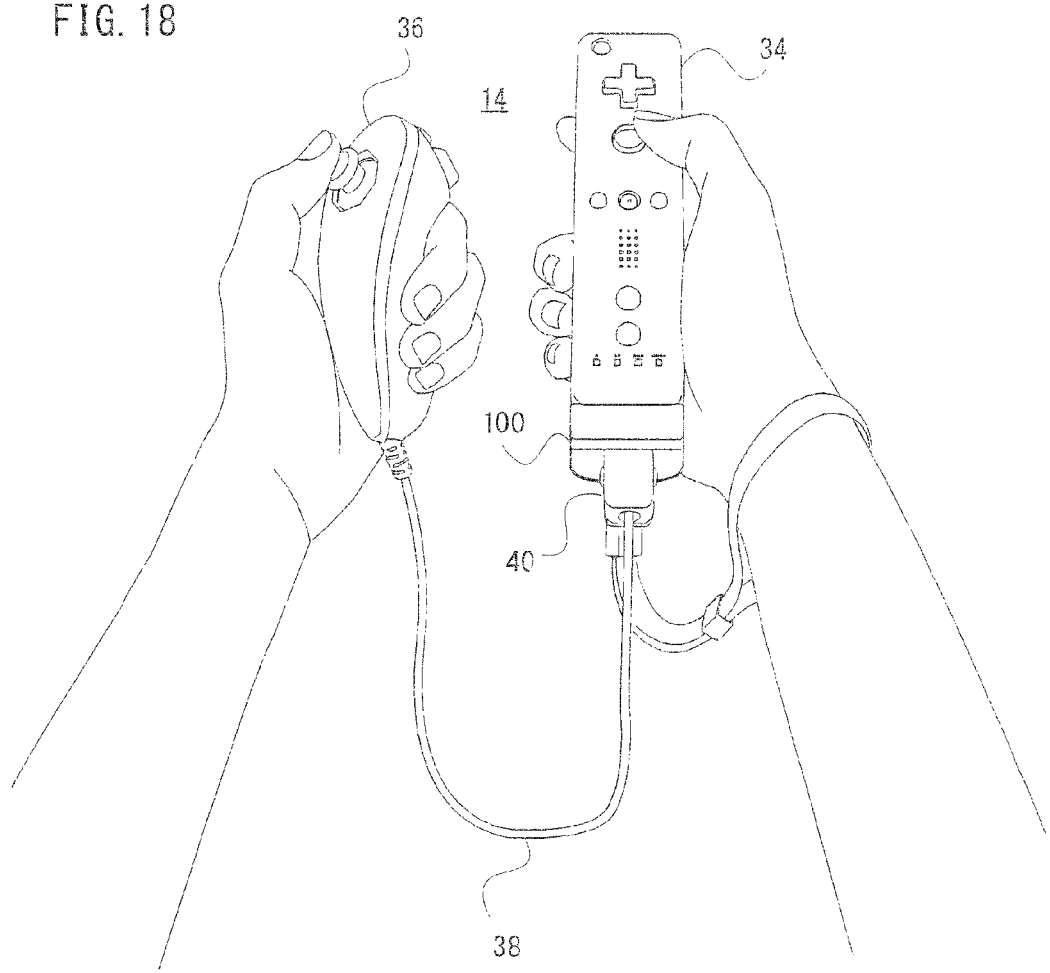
FIG. 18 is an illustrative view showing one example of a state in which a game player holds the first controller and the second controller when a game is actually played by utilizing the controllers.

In this game system 10, a user can make an input to an application like a game, or the like by moving the controller 14 itself other than a button operation. In playing the game, for example, the user holds the first controller 34 (specifically, holding portion 44a of the housing 44: FIG. 2) with the right hand and the second controller 36 with the left hand as shown in FIG. 18. As described above, the first controller 34 includes the acceleration sensor 84 for detecting accelerations in the three-axis directions, and the second controller 36 also includes the acceleration sensor 86 as described before. When the first controller 34 and the second controller 36 are moved by the player, acceleration values in the three-axis directions indicating the motions of the respective controllers are detected by the acceleration sensor 84 and the acceleration sensor 86. In a case that the gyro sensor unit 100 is attached to the first controller 34, angular velocity values about the three-axes indicating the motion of the first controller 34 itself are further detected.

These detected values are transmitted to the game apparatus 12 in a form of the aforementioned controller data. In the game apparatus 12 (FIG. 10), the controller data from the controller 14 is received by the input-output processor 62a via the antenna 72a and the wireless controller module 72, and the received controller data is written to a buffer area of the internal main memory 62e or the external main memory 66. The CPU 44 reads the controller data stored in the buffer area of the internal main memory 62e or the external main memory 66, and restores the detected values, that is, the values of the acceleration and/or the angular velocity detected by the controller 14 from the controller data.

Here, the angular velocity data has two modes of the high angular velocity mode and the low angular velocity mode, and therefore, the two kinds of angular velocity restoring algorithms corresponding to the two kinds are prepared. In restoring the angular velocity value from the angular velocity data, the angular velocity restoring algorithm corresponding to the mode of the angular velocity data is selected on the basis of the angular velocity mode information.

The CPU 60 may execute processing for calculating a velocity of the controller 14 from the restored acceleration in parallel with such a restoring processing. In parallel therewith, a travel distance or a position of the controller 14 can be evaluated from the calculated velocity. On the other hand, from the restored angular velocity, a rotation angle of the controller 14 is evaluated. Here, the initial value (constant of integration) when the accelerations are accumulated to calculate the velocity, and the angular velocities are accumulated to calculate the rotation angle can be calculated from the position coordinate data from the imaged information arithmetic section 50, for example. The position coordinate data can also be used for correcting the errors accumulated due to the integration.

The game processing is executed on the basis of the variables thus evaluated, such as the acceleration, the velocity, the travel distance, the angular velocity, the rotation angle, etc. Accordingly, all of the processing described above need not to be executed, and the variables necessary for the game processing may be calculated as required. It should be noted that the angular velocity and the rotation angle can also be calculated from the acceleration in principle, but this requires a complex routine for the game program, which also imposes a heavy processing load on the CPU 60. By utilizing the gyro sensor unit 100, a development of the program is made easy, and the processing load on the CPU 60 is reduced.

By the way, some games may be a game for single controller of utilizing only the first controller 34 and other games may be a game for two controllers of utilizing the first controller 34 and the second controller 36, and the respective games are classified into a gyro-compatible type and a gyro-incompatible type. The first controller 34 being a main controller is required for playing all the games. Furthermore, the second controller 36 being an expanding controller is connected to the first controller 34 via the gyro sensor unit 100 or directly when the game for two controllers is played, and is removed in general when the game for single controller is played.

On the other hand, the gyro sensor unit 100 being an expanding sensor or an expanding controller is not required when the gyro-incompatible game is played, but it is not required to take the trouble to be removed. Thus, the gyro sensor unit 100 generally remains to be attached to the first controller 34, and dealt as a single unit with the first controller 34. The second controller 36 is detachable similar to a case that the gyro sensor unit 100 is not involved except that the connection destination of the connector 40 is changed from the connector 42 to the connector 108.

FIG. 19 shows a table in which a control by the microcomputer 102 of the gyro sensor unit 100 is described for each mode. The mode prepared for the gyro sensor unit 100 is four kinds of the aforementioned "standby", "bypass", "gyro" and "gyro and second controller", and the target to be controlled by the microcomputer 102 covers six items of "gyro function", "gyro power source", "bus switch", "expanding connector", "Attach1" and "I2C address".

The gyro function is in a stopped state (No Active) in each of the standby mode and the bypass mode, but is in a started-up state (Active) in each of the gyro mode and the gyro and second controller mode. A power supply to the gyro power source, that is, the gyro sensor 104 is stopped (OFF) in each of the standby mode and the bypass mode, and executed (ON) in each of the gyro mode and the gyro and second controller mode. The bus switch SW is connected (Connect) in each of the standby mode and the bypass mode, and isolated (Disconnect) in each of the gyro mode and the gyro and second controller mode.

The expanding connector, that is, the connector 108 is in a started-up state in each of the bypass mode and the gyro and second controller mode, and in a stopped state in each of the standby mode and the gyro mode. The Attach1 is controlled to "Low" indicating an unconnected state in the standby mode, and to "High" indicating a connected state in each of the bypass mode, the gyro mode and the gyro and second controller mode. In relation to the I2C address, a special address is noted only in each of the standby mode and the bypass mode.

The mode switching is performed shown in a manner in FIGS. 20(A) and 20(B). FIG. 20(A) shows switching processing in a case that the application is gyro-compatible, and FIG. 20(B) shows switching processing in a case that the application is gyro-incompatible. In common to FIG. 20(A) and FIG. 20(B), that is, irrespective of whether the gyro-compatible application or the gyro-incompatible application, the gyro sensor unit 100 starts up in response to the gyro sensor unit 100 itself being connected to the first controller 34, and enters in a standby mode being an initial mode. Here, when the second controller 36 is connected to the gyro sensor unit 100, the standby mode shifts to the bypass mode, and when the second controller 36 is then removed therefrom, the bypass mode is restored to the standby mode.

Here, the gyro-compatible application issues a call and a reset to the gyro sensor unit 100 in order to fetch angular velocity data as required. As described above, in this embodiment, it is possible to control the controller from the game machine by the communication, and therefore, by the application, it is possible to control the gyro sensor unit 100. Thus, when receiving a call from the application in the standby mode, the gyro sensor unit 100 shifts to the gyro mode, and when receiving a reset from the application in the gyro mode, the gyro sensor unit 100 is restored to the standby mode. The gyro sensor unit 100 shifts to the gyro and second controller mode when being connected with the second controller 36 in the gyro mode, and is restored to the gyro mode when being disconnected with the second controller 36 in the gyro and second controller mode. The gyro sensor unit 100 further shifts to the bypass mode when receiving a reset from the application in the gyro and second controller mode, and is restored to the gyro and second controller mode when receiving a call from the application in the bypass mode.

On the other hand, the gyro-incompatible application does not have a function of performing a call and a reset with respect to the gyro sensor unit 100. Thus, when the gyro-incompatible application is executed, the mode of the gyro sensor unit 100 is merely switched between the standby mode and the bypass mode as shown in FIG. 20(B).

The mode switching by the gyro sensor unit 100 is realized with reference to the table shown in FIG. 19 by the microcomputer 102, but the detailed description thereof is omitted here.

One example of a virtual game by utilizing such a game system 10 is explained with reference to the drawings. First, an outline of the game is explained. This embodiment is equivalent to the above-described gyro-compatible application, so that the gyro sensor unit 100 is attached to the remote controller 34, and the Nunchaku 36 is also used. The game in this embodiment is for competing scores, by moving a moving object (first object) such as an arrow within a game space with a shooting apparatus (second object) such as a bow, depending on whether or not the arrow hits a fixed object like a target, where the arrow hits. For example, the user can perform an operation by regarding the remote controller 34 as a bow and the Nunchaku 36 as an arrow fixed to the bow in a posture shown in FIG. 29. That is, by the gyro sensor unit 100 attached to the remote controller 34, an attitude of the remote controller 34 can be calculated, and therefore, it is possible to control a direction to which the bow is faced in the game, and by the acceleration sensor of the Nunchaku 36, it is possible to detect a motion such as drawing a bow.

Figure 21:
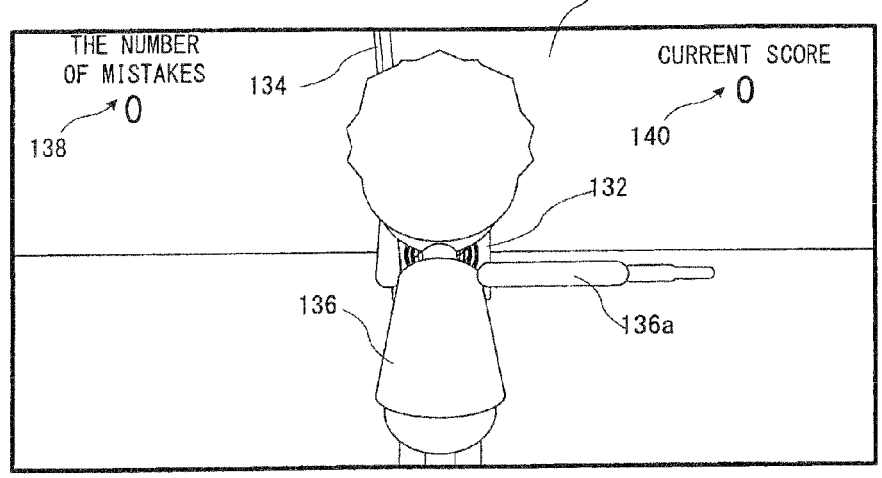
FIG. 21 is an illustrative view showing one example of a game screen displayed on the monitor shown in FIG. 1.

FIG. 21 is an illustrative view showing one example of a game screen 130 of the above-described virtual game. In the game screen 130 shown in FIG. 21, a target (fixed object) 132 is displayed, and a player object 136 shoots an arrow object 142 (FIG. 22) into the target object 132 by utilizing a bow object 134. The situation in FIG. 21 here is for illustrating a stage in which the player operates the A button 46d (FIG. 2), for example, that is, a stage before the player object 136 fixes the arrow to the bow.

A display area 138 for displaying the number of mistakes is formed at an upper left of the game screen 130, and a display area 140 for displaying a current score is formed at an upper right thereof.

Figure 22:
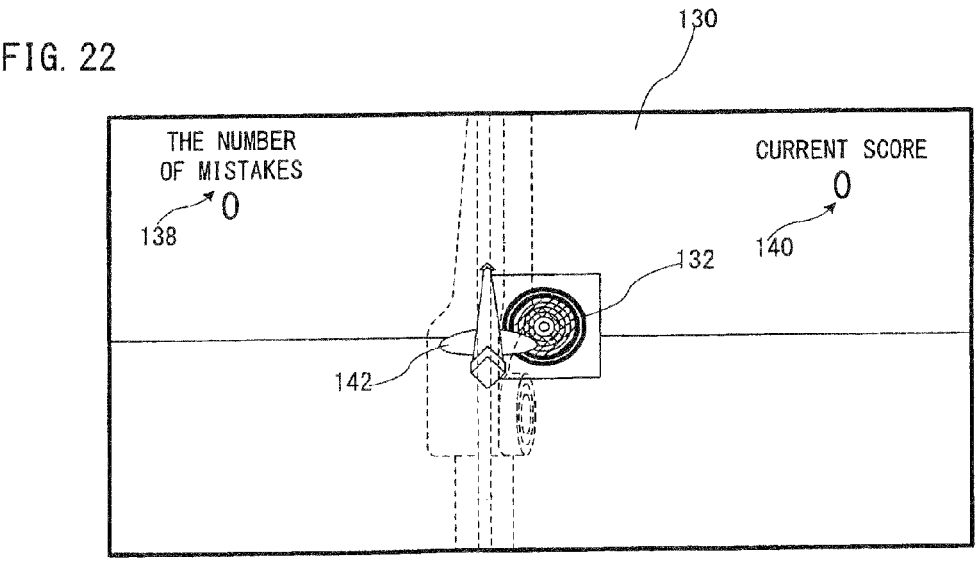
FIG. 22 is an illustrative view showing another example of the game screen.
Figure 29:
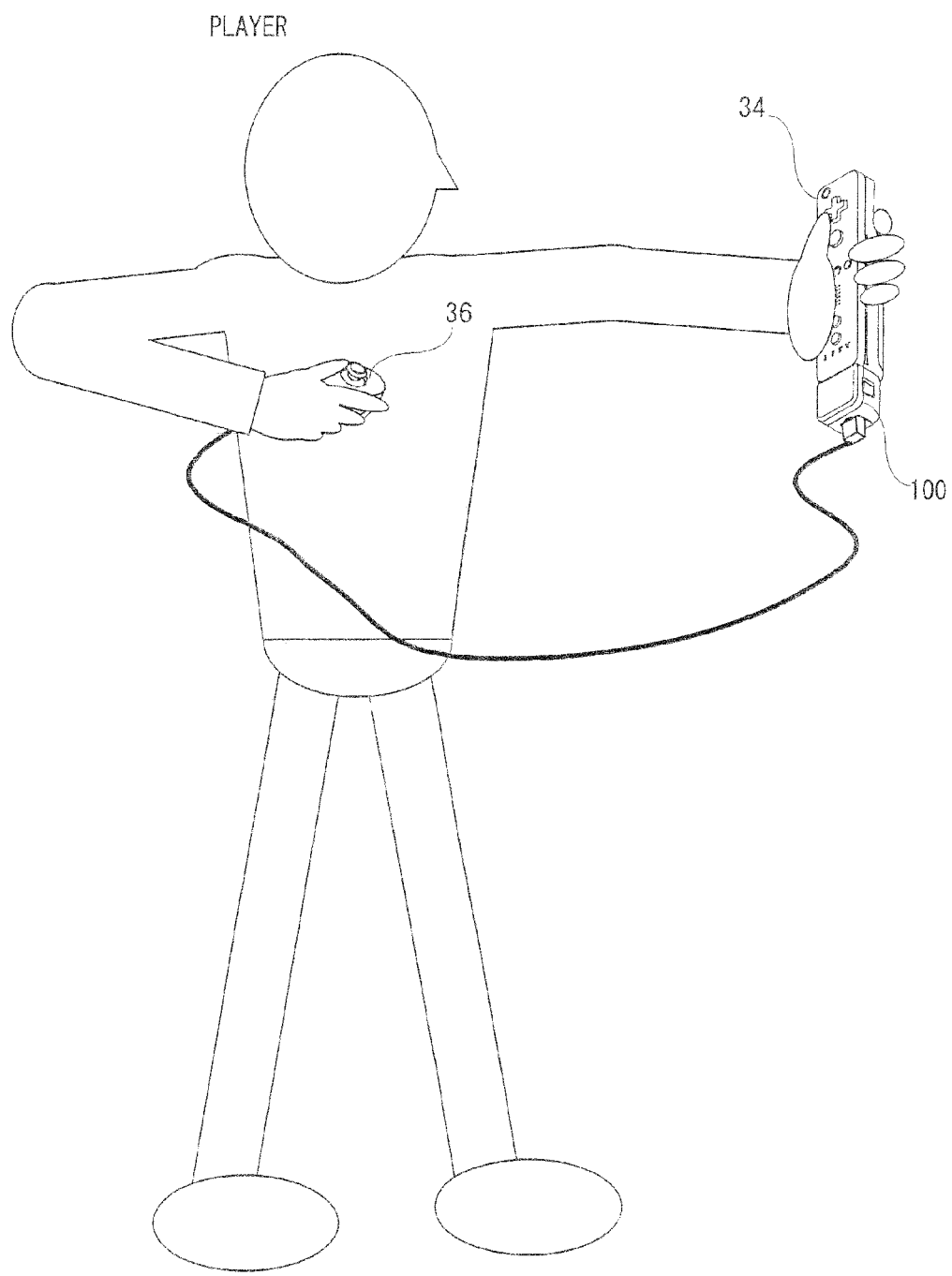
FIG. 29 is an illustrative view showing a situation in which a user plays the game in this embodiment.

In this embodiment, when the player pushes (turns on) a predetermined button (A button 46d or B button 46h, for example) of the controller 34 in a state that he or she poises to vertically hold the remote controller 34 as shown in FIG. 29, the screen in FIG. 21 is changed to a screen shown in FIG. 22 in which the virtual camera is close to the arrow, and switched its view point to that viewed from the player object, which allows the arrow (moving) object 142 (FIG. 22) to be fixed to the bow object 134. Here, the image of the player object 136 includes an arm 136a.

Thus, the reason why a shooting operation is made after the screen (view point) is switched in response to the operation of the A button 46d or the B button 46h is that the game player holding the controller 34 connected with the gyro unit 100 has to be opposed to the monitor 26 (FIG. 1) before start of a shooting operation. The gyro sensor 104 (FIG. 11, FIG. 12) merely detects a change of the attitude of the gyro sensor unit 100 attached therewith, that is, the first controller or the remote controller 34, and never detects an absolute attitude of the remote controller 34. In other words, even if the player performs an operation to change the attitude of the controller 34 in a state that the player is not opposed to the monitor 26, the attitude change data is input to the game apparatus 12, that is, the CPU 60 (FIG. 10) as described above, so that proper game processing can be executed by the CPU 60. That is, the game player can operate the object within the game space in a state the player does not face the monitor 26. However, this is unnatural, and therefore, a shooting operation is made to be started after the player is opposed to the monitor, and whereby the position and direction (attitude) of the controller 34 in the real space when the moving object 142 is shot are guided to a desired position and a desired attitude. That is, it is desirable that the player starts the game with the controller 34 vertically holding while opposed to the monitor 26 as shown in FIG. 29. On the contrary, in a case that a game is played by a plurality of players, they can play the game as required similar to the game played by a single player even if they are not to be opposed to the monitor 26.

According to the button operation, as shown in FIG. 22, the player object 136 sets (fixes) the arrow object 142 to the bow object 134. In that state, the player adjusts a moving direction (shooting direction) of the arrow object while vertically holding and moving the controller 34.

On the game screen 130 shown in FIG. 22, the player object 136 which was clearly displayed in FIG. 21 is displayed very lightly (semi-translucently), and only the target object 132 and the arrow object 142 are clearly visually identified. The reason is that if the player object 136 is normally displayed, the target object 132 and the arrow object 142 are hidden under the player object 136, so that the moving direction (aim) of the arrow object 142 cannot be suitably set.

Although the moving direction of the arrow object 142 is adjusted or set in a state of FIG. 22 here, in the related art described before, this is performed by an operation of the cross key, so that it takes a lot of time. On the contrary thereto, in this embodiment, this is controlled by the changes of the position and attitude of the controller 34 detected by the gyro sensor 104 (FIG. 11, 12) attached to the controller 34. That is, by merely directing the controller 34 toward the target object 132 displayed on the game screen 130, a planned moving direction (moving direction) of the arrow object 142 can be decided, and therefore, it is possible to quickly set the planned moving direction. Furthermore, the player can intuitively make an operation as if he or she actually holds a bow to aim to a target.

Figure 23:
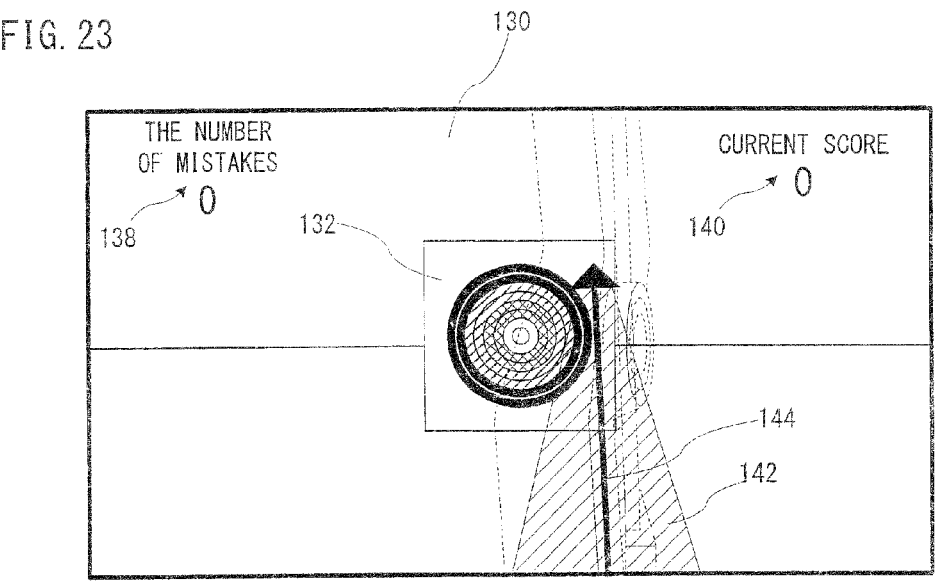
FIG. 23 is an illustrative view showing a still another example of the game screen.

Then, an operation of drawing the fixed arrow is performed by a predetermined operation by the user. For example, by drawing the Nunchaku 36 connected to the controller 34 at accelerations equal to or more than a constant speed in a direction close to the player (in a direction far away from the monitor 26) with the C button 54b and the Z button 54c (FIG. 3) attached thereto simultaneously pushed on (turned on), the player can perform an operation such that the player object 136 draws the arrow object 142. In a state that the arrow is drawn, the arrow is displayed toward the viewer as shown in FIG. 23. Furthermore, at this time, the shooting direction of the arrow may be displayed by an arrow object 144 in FIG. 23 so as to be aimed. In the state that the arrow is drawn as shown in FIG. 23 also, similar to the state shown in FIG. 22, by continuing to change the attitude of the controller 34, the direction of the bow can be changed. That is, even while the bow is drawn, it is possible to adjust the shooting direction of the arrow.

By simultaneously releasing (turning off) the C button 54b and the Z button 54c of the Nunchaku 36 after the moving direction of the arrow object 142 is decided in FIG. 22, that is, FIG. 23, the arrow object 142 is released from the bow object 134 (FIG. 21) to fly to the decided moving direction at a predetermined initial velocity. The arrow object 142 flies, while drawing a parabolic orbit according to a physical calculation, etc., toward the target object 132 when the player's aim is accurate. The animation showing the state is displayed on the game screen 130 shown in FIG. 24. The reference numeral 142a denotes an animation image of the arrow object 142.

Figure 25:
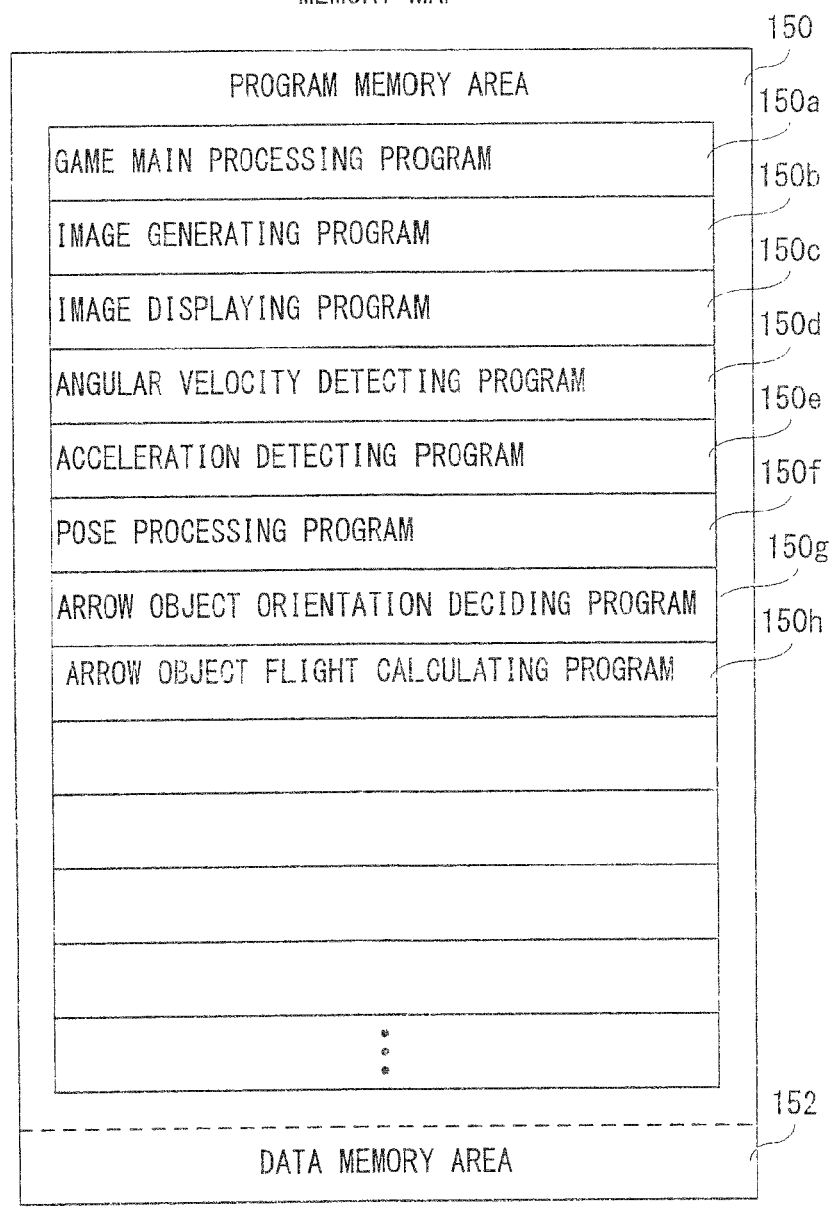
FIG. 25 is an illustrative view showing a memory map of a main memory shown in FIG. 10.
Figure 26:
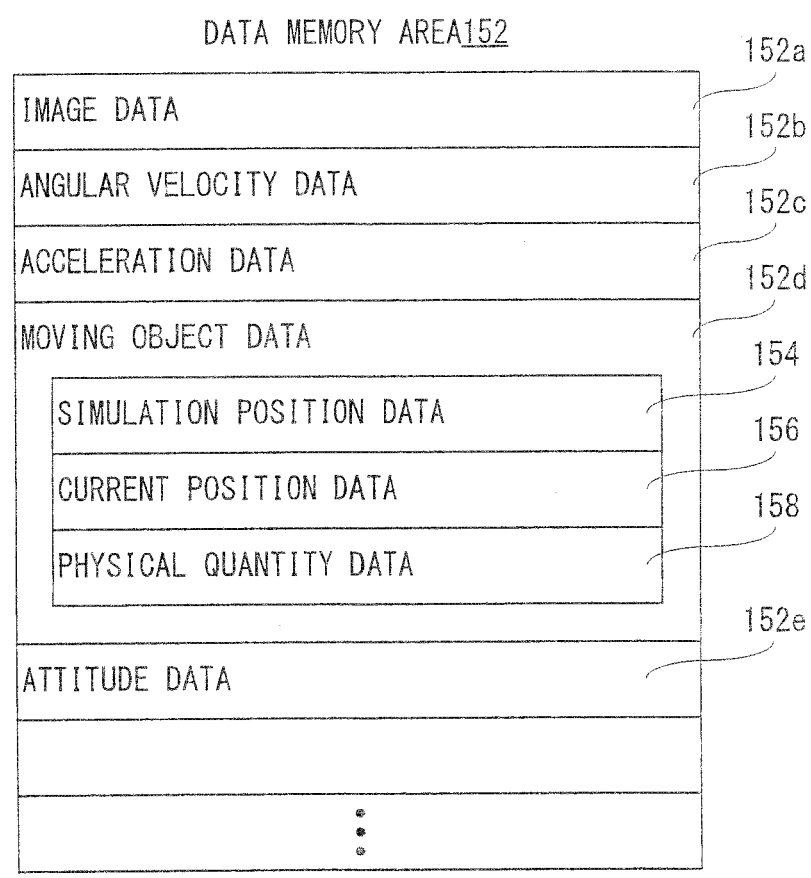
FIG. 26 is an illustrative view showing a concrete example of a data memory area shown in FIG. 25.

Next, the game processing for carrying out the above-described game is explained in detail. FIG. 25 is an illustrative view showing a memory map of the internal main memory 62e or the external main memory 66 shown in FIG. 2. As shown in FIG. 25, the main memory (62e, 46) includes a program memory area 150 and a data memory area 152. Additionally, the detailed contents of the data memory area 152 are shown in FIG. 26.

The program memory area 150 stores a game program, and the game program is made up of a game main processing program 150a, an image generating program 150b, an image displaying program 150c, an angular velocity detecting program 150d, an acceleration detecting program 150e, a posing processing program 150f, an arrow object orientation deciding program 150g, an arrow object flight calculating program 150h, etc.

The game main processing program 150a is a program for processing a main routine of the virtual game of this embodiment. The image generating program 150b is a program for generating a game image to display a game screen 130 on the monitor 26 by utilizing image data 152a (see FIG. 26) described later. The image displaying program 150c is a program for displaying the game image generated according to the image generating program 150b on the monitor 26 as a game screen 130.

The angular velocity detecting program 150d is a program for detecting angular velocity data as to angular velocities detected by the gyro sensor 104. As described above, the angular velocity data is included in the input data from the controller 34, and therefore, the CPU 60 detects the angular velocity data included in the input data from the controller 34 according to the angular velocity detecting program 150d.

The acceleration detecting program 150e is a program for detecting acceleration data as to accelerations detected by the acceleration sensors 84 and 86 (FIG. 11). As described above, the acceleration data is included in the input data from the controller 34, and therefore, the CPU 60 detects one or two acceleration data included in the input data from the controller 34 according to the acceleration detecting program 150e.

Figure 28:
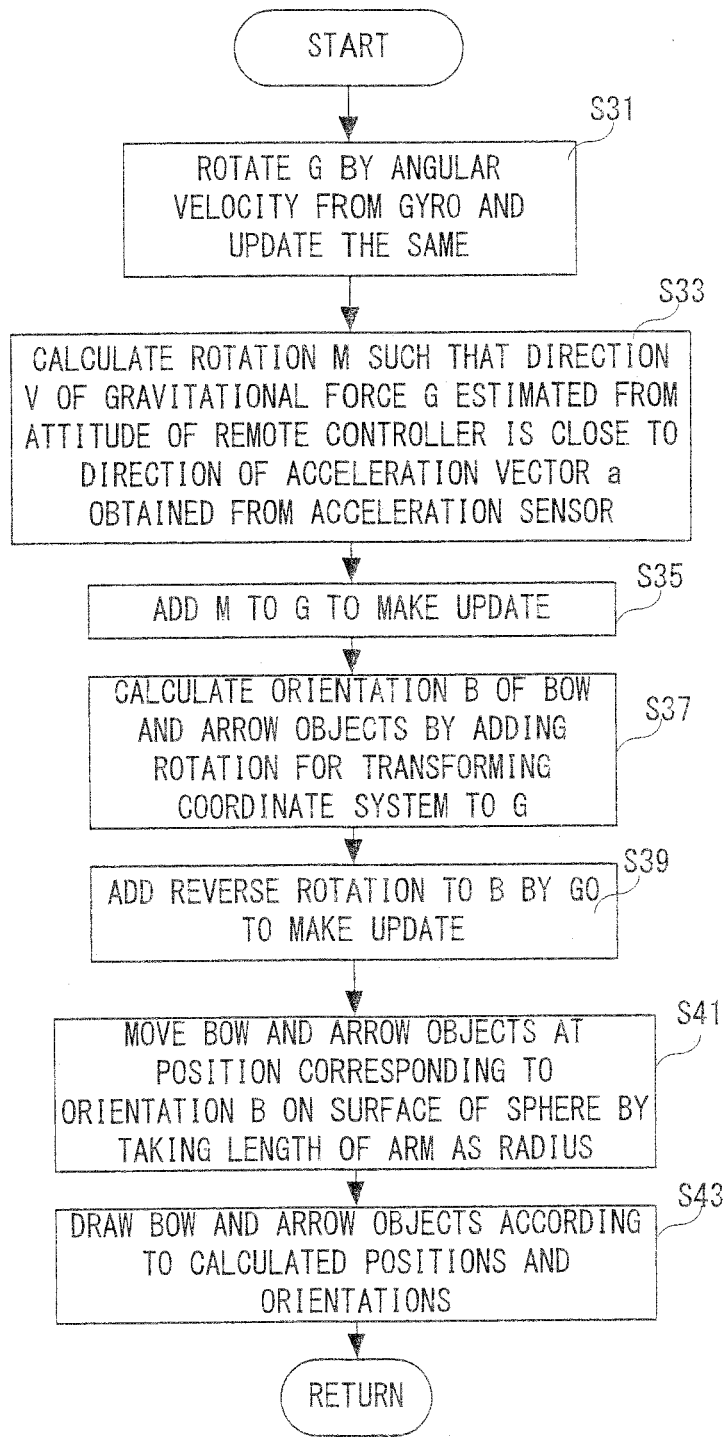
FIG. 28 is a flowchart showing an operation of posing processing shown in FIG. 27.

The posing processing program 150f is a program for deciding orientations of the bow object and the arrow object 144 within the game space, and accordingly deciding a moving direction of the moving object, that is, the arrow object 144 after the shot. This posing processing is executed from when the arrow object is fixed to the bow object to when the arrow object is shot. The detail is shown in FIG. 28.

The arrow object flight calculating program 150h is a program for calculating a flying trace of the arrow object 144 after it is released from the bow object 142 according to a principle of physics (parabola).

Although illustration is omitted, the game program also includes a sound output program, a backup program, etc. The sound output program is a program for outputting music necessary for the game, such as music (BGM), a voice or an onomatopoeic sound of an object, a sound effect, and the like by utilizing sound (music) data. The backup program is a program for saving (storing) game data (proceeding data, result data) in the memory card.

Furthermore, as shown in FIG. 26, the data memory area 152 stores various data, such as image data 152a, angular velocity data 152b, acceleration data 152c, moving object data 152d, etc. Although not shown, the data memory area 152 is provided with a timer, a register, and a necessary flag area, in addition, as required.

The image data 152a is image data for generating a game image, and includes polygon data, texture data, etc. Specifically, in this embodiment, this includes the fixed object (target object) 132, the bow object 134, the player character 136, the arrow object 142, and moreover animation image data which are to be displayed on the game screen 130 described later. The angular velocity data 152b is angular velocity data detected according to the angular velocity detecting program 150d. Here, in this embodiment, three or four angular velocity data are detected per frame. The acceleration data 152c is acceleration data of the remote controller 34 and the Nunchaku 36 detected according to the acceleration detecting program 150e. The data on the angular velocities and accelerations are calculated per frame in order to calculate an attitude, but plurality of frame of data (20 pieces, for example) may be stored in order to make a correction, etc.

The moving object data 152d is data as to the moving object, that is, the arrow object 142, and includes simulation (flying trace) position data 154, current position data 156 and physical quantity data 158. The simulation position data 154 is three-dimensional coordinate data of the arrow object 142 for every frame. Furthermore, the current position data 156 is three-dimensional coordinate data of the arrow object 142 as to a current frame. The physical quantity data 158 is data as to physical quantities, such as gravity, air resistance, lift by a rotation and lift by a plane effect which are exerted on the moving object 142 at the current frame.

Attitude data 152e is data for storing the attitude of the controller 34 calculated in the posing processing program 150f, and the orientations, etc. of the bow and arrow calculated on the basis thereof.

Although illustration is omitted, the data memory area 152 also stores other data, such as sound data, score data, and is provided with another timer (counter) and another flag which are required for the game.

Figure 27:
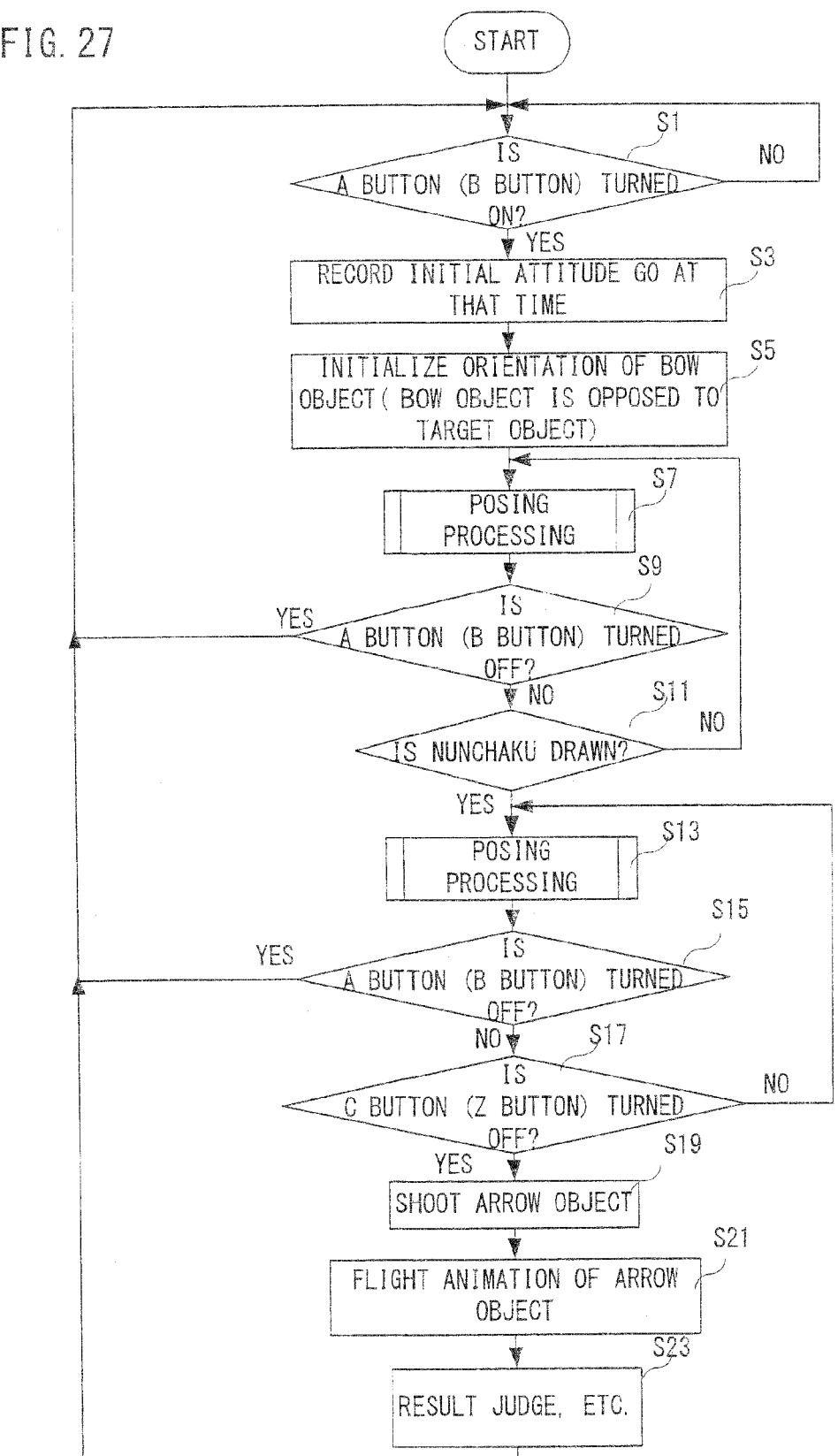
FIG. 27 is a flowchart showing a game processing by the CPU shown in FIG. 10 in this embodiment.

The processing of this embodiment executed by the CPU 60 shown in FIG. 10 is explained with reference to FIG. 27 and FIG. 28. As shown in FIG. 27, when that the A button 46d or the B button 46h of the remote controller or the first controller 34 is turned on by the game player is detected in a step S1, the CPU 60 starts the game processing for shooting a bow. The operation data is transmitted from the communication unit 88 (FIG. 11) of the first controller 34 to the game apparatus 12 as described before, and therefore, the CPU 60 can determine whether the A button 46d or the B button 46h is turned on with reference to the operation data temporarily stored in the data memory area 152 at that time.

If "YES" is determined in the step S1, the CPU 60 records an initial attitude at that time of the remote controller 34, that is, the gyro sensor unit 100 in the data memory area 152 in a next step S3. Here, the attitude is represented by a 3×3 rotating matrix G, and stored in a form of a matrix indicating that the remote controller 34 is rotated from the state as a reference. Accordingly, the attitude G is for representing how long the remote controller 34, that is, the gyro sensor unit 100 is rotated from a state that the remote controller 34 is opposed to the monitor 26 and placed horizontally, that is, from the straight state. The straight state is a value previously calculated, and this is evaluated by deciding an absolute value from the acceleration data when no acceleration except for the gravity is applied, such as during stop of the remote controller 34. Here, the attitude in the yaw direction cannot be calculated from the gravity, and therefore, as to the yaw direction, an attitude at a predetermined timing is defined as a straight attitude. Accordingly, if an operation of stopping the remote controller 34 with the controller directed toward the monitor, and the like is performed in an initial setting, etc. before the game, the absolute attitude of the remote controller 34 continues to be calculated thereafter. It should be noted that the attitude G is always updated in order to continue to calculate the absolute attitude (or the attitude assumed to be an absolute) of the remote controller 34, and therefore, it is also constantly updated except when the game in this embodiment is performed, but in another embodiment, an initial setting may be performed for each shooting of the bow or for each predetermined timing. Then, in the game processing of this embodiment, the attitude G of the remote controller 34 when the A button is turned on is stored as an initial attitude G0.

In a succeeding step S5, the CPU 60 initializes an orientation of the bow object 142 (FIG. 22). That is, the attitude corresponding to the attitude G0 at a timing when the A button is turned on is set so as to be corresponded to the state that the bow is straightly directed to the target object 132. The state is a state shown in FIG. 22.

After the state shown in FIG. 22 is made, that is, the orientation of the bow object 142 is initialized, posing processing shown in a next step S7 is executed. This posing process is specifically executed according to the procedure shown in FIG. 28.

In steps S31-S35 shown in FIG. 28, the CPU 60 rotates the attitude G of the remote controller 34 at the angular velocities detected by the gyro sensor 104, and updates the same. This is obtained by adding a rotation per unit of time indicated by the angular velocities to the current attitude G. Then, a correction by utilizing the accelerations as in the step S33 is further performed on the calculated attitude G. More specifically, a rotation M is calculated such that the attitude, that is, the vertically below direction indicated by the rotating matrix G, that is, the direction of gravitational force v estimated from the attitude of the remote controller 34 is near to the direction of the acceleration vector a detected by the acceleration sensor 84 (FIG. 11) of the remote controller 34. The rotation amount of the rotation M is set as one example such that the closer the magnitude of the acceleration vector a is to the magnitude of the gravitational acceleration, the closer the gravitational direction v is to the acceleration vector a. That is, since it is considered that the absolute attitude can be calculated from the gravitational acceleration, by bringing the directly below direction v indicated by the attitude G close to the a assumed to be the gravitational acceleration, it is possible to reduce the effect due to errors by the gyro. Thereupon, it is considered that the closer the magnitude of the acceleration is to the size of the gravitational acceleration, the less the effect of the accelerations except for the gravitational acceleration is, and therefore, the degree of closeness is heightened. Then, in the next step S35, the rotation M is added to the rotating matrix G to update the G. That is, the rotation is made such that the aforementioned correction is added to the G.

Thus, in the step S33, the reason why the attitude of the remote controller 34 is corrected for each frame by the accelerations is for removing accumulated errors peculiar to the gyro sensor as soon as possible.

It should be noted that the processing from the step S31 to the step S35 is also constantly performed except during the execution of the game processing in FIG. 27 for the purpose of continuing to calculate the absolute attitude of the remote controller 34. Here, if the errors of the gyro are not taken into account, the attitude G of the remote controller 34 may be decided only by the angular velocities by only the step S31 without utilizing the correction step in the steps S33 and S35.

In next steps S37-S39, the CPU 60 updates the orientation of the bow object 142 in response to the attitude of the remote controller 34. First, in the step S37, an orientation B of the bow object 142 is calculated according to the rotating matrix G updated in the step S35. That is, the attitude of the remote controller 34 detected by the gyro sensor is reflected on the orientation of the bow object 142 on the game screen 130. More specifically, a coordinate transformation for transforming the rotating matrix (attitude) G of the remote controller 34 into the orientation of the bow object 142 is executed. The orientation B of the bow object 142 is also represented by a form of a rotating matrix with 3×3, for example. Specifically, since the operation of the bow is assumed to be made with the remote controller 34 being upright as shown in FIG. 29, the transformation is added such that the bow object is made straight in a state that the remote controller is made upright toward the player at a 90-degree angle. The orientation of the arrow object 144 is decided in correspondence to the orientation of the bow object 142.

In the succeeding step S39, by adding a reverse rotation by the attitude G0 such that the bow object 142, that is, the arrow object 144 is reversely rotated by the basic attitude G0 when the A button 46d or the B button 46h is pushed by the game player, the CPU 60 calculates the orientation B. That is, since the user does not hold the remote controller 34 strictly upright at a timing when the button is turned on, by adding a reverse rotation by the attitude G0 such that the bow object is made straight at a timing when the button is turned on, the orientation B transformed in the step S37 is transformed to the attitude corresponding to the rotation since the button is turned on.

Thereafter, in a step S41, the CPU 60 assumes or calculates a sphere taking the arm 136a (FIG. 22) of the player character 136 as radius, and moves the bow and arrow objects 142 and 144 to a position corresponding to the orientation B on the surface of the sphere. That is, the position on the sphere is a position where the direction from the center of the sphere to the position corresponds to the direction of the arm holding the bow. Then, in a step S43, the bow and arrow objects are drawn at the positions in the orientation corresponding to the orientation B. The state is shown in FIG. 23. Then, the process returns to the main processing in FIG. 27.

Thus, in the game apparatus of this embodiment, since in correspondence to the change of the attitude G of the remote controller 34, that is, the gyro sensor unit 100, the orientation B of the bow and arrow object is changed, the game player can set or decide the moving direction of the arrow object 144 very easily and quickly by merely changing the attitude of the remote controller (gyro sensor) in a real space (it is possible to decide the aim). Thus, it is possible to realize an intuitive operation as if the player holds a real bow and aims at a target.

Additionally, in the above-described posing processing, the orientation of the bow object 142, that is, the arrow object 144 is set on the basis of the angular velocity data on the basis of the rotation about each axis. Then, in order to decide the attitude, a correction is made by the acceleration data. However, in a case that the bow object 142 is moved in the up and down direction, that is, the pitch angle is controlled, the acceleration data from the acceleration sensor may be used, and only when the bow object 142 is moved in the right and left direction (roll angle) or twisted (yaw angle), the angular velocity data from the gyro sensor 104 may be used. This makes it possible to control only the pitch angle so as to correspond to the actual attitude irrespective of the initial attitude G0. In this embodiment, since the initial orientation of the bow is brought into correspondence with the attitude when the button is turned on, especially, the yaw angle, it is possible to play the game even if the player cannot be opposed to the monitor due to problem, such as the standing position of the player and the place where the game is played, but if only the pitch angle is brought into correspondence with the absolute attitude by the accelerations, it is possible to make a premise that the game is played in a manner that the person actually shoots a bow.

Returning to FIG. 27, after execution of the posing processing in the step S7, in a step S9, the CPU 60 determines whether or not the game player turns the A button 46d or the B button 46h off by monitoring the operation data at that time. If "YES", it is estimated that the player expresses his or her own intention to restart the setting of the moving direction of the arrow object 144, and the determination in the previous processing in the step S1 is repeated.

If "NO" in the step S9, this means that the shooting operation is continued, and in that case, the CPU 60 determines whether or not an operation of drawing the arrow is performed in a succeeding step S11. More specifically, it is determined whether or not the Nunchaku 36 is drawn in a direction away from the monitor 26, that is, a direction of the player with the C button 54b and the Z button 54c thereof pushed. As a method of determining whether or not the Nunchaku 36 is drawn, the attitude of the Nunchaku 36 with reference to the Y axis is evaluated from the acceleration data. It is determined whether or not the inner product between "the unit vector in a −Z direction" of the attitude and "the difference between the acceleration in the current step (timing) of the Nunchaku 36 and the acceleration in the previous step" exceeds a constant value. If the inner product exceeds the constant value, the CPU 60 determines that the Nunchaku 36 is drawn in a −Z direction. Here, the acceleration data is stored during a predetermined period, and by multiplying a predetermined damper coefficient (low-pass filter) by the accelerations detected by the acceleration sensor 86 of the Nunchaku 36, the accelerations whose changes is mitigated and from which noise is reduced may be utilized for the determination. Here, the specific determining method in the step S11 is not restricted to the above description.

In the step S11, that is, when the second controller 36 is drawn toward the player or the near side at a speed higher than the constant, it is determined that the premise for the movement instruction is established. In the shooting game utilizing the bow and arrow as in this embodiment, by drawing the second controller, that is, the Nunchaku 36, an operation of drawing the bow can be performed, and this makes it possible to shoot an arrow by performing an intuitive operation on the bow similar to an actual drawing operation with a bow.

In this manner, when it is determined that the Nunchaku 36 is drawn in a predetermined direction in the step S11, the CPU 60 displays a state in which the player character 136 draws the bow object 142 on the game screen 130 as shown in FIG. 23.

Then, in a step S13 also, similar to the preceding step S7, posing processing is executed. Accordingly, even after the arrow is drawn, it is possible to control the shooting direction.

After execution of the posing processing in the step S13, the CPU 60 determines whether or not the A button 46d or the B button 46h is turned off by the game player in a step S15. If "YES", it is estimated that the player expresses his or her own intention to restart the setting of the moving direction of the arrow object 144, and the determination in the preceding step S1 is waited.

If "NO", the CPU 60 determines whether or not both of the C button 54b and the Z button 54c of the Nunchaku 36 are turned off in the next step S15. In this embodiment, when the Nunchaku 36 is drawn with the C button 54b and the Z button 54c thereof simultaneously pushed, it is determined that the player draws the bow, and thereafter, when both of the C button 54b and the Z button 54c of the Nunchaku 36 are simultaneously turned off, the arrow object 144 is designed to be shot. Accordingly, when "NO" is determined in the step S17, the steps S13 and S15 are repeatedly executed. Since the bow is shot by releasing the C button 54b and the Z button 54c in a state that the Nunchaku 36 is drawn, the way of shooting becomes an intuitive one as in the way of actually shooting a bow and an arrow.

If "YES" is determined in the step S17, the CPU 60 makes the arrow object 144 shoot from the bow object 142. At this time, assuming that the arrow object 144 is shot to the position and orientation (where the arrow is directed) of the arrow object 144 decided in the posing processing in the step S13 at a predetermined initial velocity, a flying trace of the arrow object is calculated according to the flying trace calculation program in view of the physical quantities stored in the data memory area 152.

Figure 24:
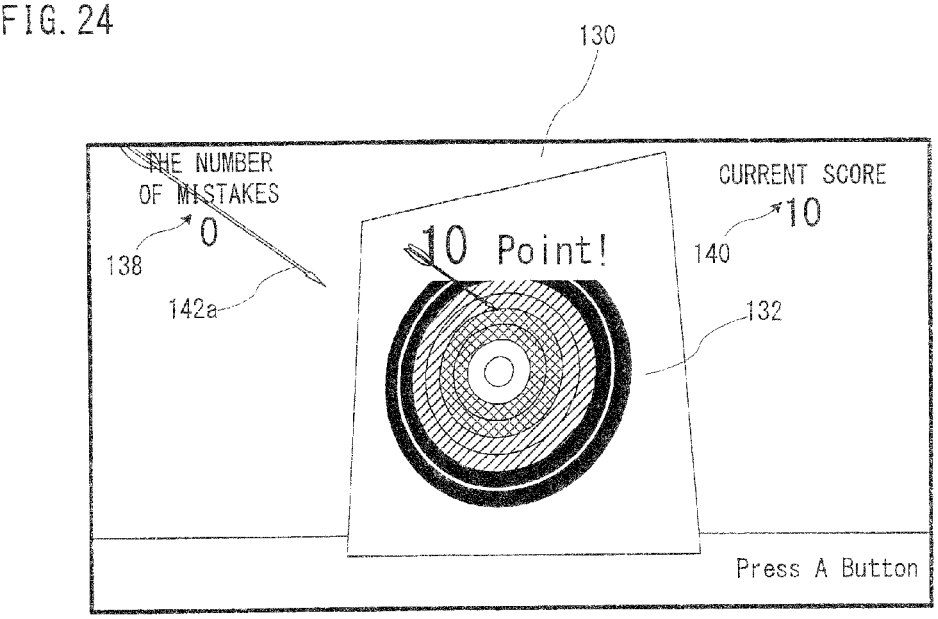
FIG. 24 is an illustrative view showing a further example of the game screen.

Then, in a step S21, the CPU 60 draws a flight animation of the arrow object 144 as in the game screen shown in FIG. 24.

Last, whether or not the arrow object 144 thus flied hits the target object 132, which position the arrow object 144 hits are calculated according to a well-known collision determining calculation, and a result judge in a step S23 is executed by summing up scores, and so on. Of course, if the arrow object 144 hits the center, a high score is evaluated, and as the hit is departed from the center, the score is low.

Additionally, in the above-described embodiment, when the Nunchaku 36 is drawn toward the near side with the C button 54b and the Z button 54c of the Nunchaku 36 simultaneously pushed, the bow is adapted to be drawn, and when the C button 54b and the Z button 54c are simultaneously released, the arrow is adapted to be shot. That is, as a movement instruction inputting means, a forward and backward motion of the second controller, that is, the Nunchaku 36 and a button operation are employed. However, a method of the movement instruction may be replaced with a method of drawing a bow by an inclining operation of the joystick 54a of the Nunchaku 36, and shooting an arrow by releasing it. In that case, when the absolute value (distance from the origin point) of the two-axis of the joystick 54a exceeds a threshold value, the bow is drawn ("YES" is determined in the step S11), and if the difference between the absolute values at the previous frame and the current frame is severely reduced from a constant value, or if the absolute value is below the threshold value, the arrow may be released ("YES" is determined in the step S17). In this embodiment, the movement instruction inputting means eventually input a movement instruction in response to the shift operation from the backward inclination to the forward inclination of the joystick 54a. In this example also, the element of drawing and then releasing an object is included, and therefore, this may be an intuitive operation of shooting a bow and an arrow. Furthermore, in other cases, a movement instructing input by a simple button operation may be applied.

In addition, the movement instruction inputting means may be replaced with a specific operation button, such as the A button 46d of the first controller 34. In that case, when the A button 46d is turned on, a movement instruction may be input.

In the above-described embodiment, the gyro unit 100 (gyro sensor 104) is connected to the controller 34, but the gyro sensor 104 may be included in the controller 34.

Although the present embodiments have been described and illustrated in detail, it is clearly understood that the same is by way of illustration and example only and is not to be taken by way of limitation, the spirit and scope of the present embodiments being limited only by the terms of the appended claims.

What is claimed is:

1. A game apparatus which performs game processing according to data from a first controller and a second controller, the first controller including a first inertia sensor and an operating portion, the game apparatus comprising one computer configured to perform at least:

first determining for determining a movement of said first controller in a predetermined direction away from a reference point on the basis of data from said first inertia sensor, second determining for determining an operation of said operation portion, movement starting for, when said second determining determines the operation of said operation portion after said first determining determines the movement of said first controller in the predetermined direction, starting to move a first object within a game space in a predetermined direction, and planned moving direction setting for changing the moving direction of said first object in accordance with data from said second controller, wherein the first controller moves in a predetermined direction away from the second controller.

2. The game apparatus according to claim 1, wherein said second controller includes a gyro sensor, and outputs angular velocity data on the basis of an output from said gyro sensor, and said planned moving direction setting changes the planned moving direction of said first object on the basis of said angular velocity data.

3. The game apparatus according to claim 1, wherein said second controller includes a second inertia sensor, and outputs inertia data on the basis of an output from said second inertia sensor, and said planned moving direction setting changes the planned moving direction of said first object according to the attitude of the second controller on the basis said inertia data.

4. The game apparatus according to claim 1, wherein said operating portion includes a first key, and outputs key data on the basis of an operation performed on said first key, and said movement starting instructs said first object to move at a timing when said key data satisfies a predetermined condition.

5. The game apparatus according to claim 4, wherein when said first controller moves to a position along a predetermined direction away from a reference point with said first key operated on the basis of said key data, said movement starting instructs said first object to move at a timing when the operation performed on said first key ceases.

6. The game apparatus according to claim 1, wherein said first controller includes a stick configured to perform a direction input, and outputs stick input data, and said movement starting instructs said first object to move at a timing when the stick input data satisfies a predetermined condition.

7. The game apparatus according to claim 3, wherein said second controller further includes a second key, and further outputs key data on the basis of an operation performed on said second key, and said predetermined direction is set on the basis of a change of the attitude of the second controller from a reference, the reference being set on the basis of the attitude of the second controller when said operation is performed on said second key.

8. A non-transitory storage medium configured to being read by a processor of a game apparatus which performs game processing according to data from a first controller and a second controller, the first controller including a first inertia sensor and an operating portion, said storage medium storing a program, said program causes said processor to at least perform:

determining a movement of said first controller in a predetermined direction away from a reference point on the basis of data from said first inertia sensor, determining an operation of said operation portion, and
when said operation of said operation portion is determined after the movement of said first controller in the predetermined direction is determined, starting to move a first object within a game space in a predetermined direction, and changing the moving direction of said first object in accordance with data from said second controller, wherein the first controller moves in a predetermined direction away from the second controller.

9. A control method of a game apparatus which performs game processing according to data from a first controller and a second controller, the first controller including a first inertia sensor and an operating portion, including:

determining a movement of said first controller in a predetermined direction away from a reference point on the basis of data from said first inertia sensor, determining an operation of said operation portion, and when said operation of said operation portion is determined after the movement of said first controller in the predetermined direction is determined, starting to move, via one or more computer processing devices, a first object within a game space in a predetermined direction, and changing the moving direction of said first object in accordance with data from said second controller, wherein the first controller moves in a predetermined direction away from the second controller.

10. A game processing system which performs game processing according to data from a first controller and a second controller, the first controller including a first inertia sensor and an operating portion, the game processing system comprising one or more computer processors, configured to:

determine a movement of said first controller in a pulling direction on the basis of data from said first inertia sensor, determine an operation of said operation portion, when said operation of said operation portion is determined after said movement of said first controller in a pulling direction is determined, start to move a first object within a game space in a predetermined direction, and change the moving direction of said first object in accordance with data from said second controller, wherein the first controller moves in a predetermined direction away from the second controller.

* * * * *